US012558934B2

(12) United States Patent
Bender

(10) Patent No.: US 12,558,934 B2
(45) Date of Patent: Feb. 24, 2026

(54) DAMPER OIL SEAL CAP WITH SEAL PROTECTION FEATURE

(71) Applicant: Federal-Mogul Motorparts LLC, Northville, MI (US)

(72) Inventor: Michael Bender, Carleton, MI (US)

(73) Assignee: Federal-Mogul Motorparts LLC, Northville, MI (US)

( * ) Notice: Subject to any disclaimer, the term of this patent is extended or adjusted under 35 U.S.C. 154(b) by 384 days.

(21) Appl. No.: 18/315,840

(22) Filed: May 11, 2023

(65) Prior Publication Data

US 2024/0375472 A1    Nov. 14, 2024

(51) Int. Cl.
B60G 13/08 (2006.01)
B60G 15/06 (2006.01)

(52) U.S. Cl.
CPC ............. B60G 13/08 (2013.01); B60G 15/06 (2013.01); *B60G 2202/143* (2013.01); *B60G 2202/32* (2013.01); *B60G 2206/41* (2013.01); *B60G 2800/162* (2013.01)

(58) Field of Classification Search
CPC .... B60G 13/08; B60G 15/06; B60G 2202/32; B60G 2202/143; B60G 2206/41; B60G 2800/162
USPC ................................. 188/315, 322.16–322.18
See application file for complete search history.

(56) References Cited

U.S. PATENT DOCUMENTS

| | | | | |
|---|---|---|---|---|
| 4,189,033 | A * | 2/1980 | Katsumori | F16F 9/364 |
| | | | | 137/853 |
| 4,360,085 | A * | 11/1982 | Pendergast | F16F 9/364 |
| | | | | 188/315 |
| 4,364,457 | A * | 12/1982 | Wossner | F16F 9/3242 |
| | | | | 267/217 |
| 6,158,559 | A * | 12/2000 | Asa | F16C 29/084 |
| | | | | 267/64.11 |
| 6,199,844 | B1 * | 3/2001 | McCormick | B60G 21/0551 |
| | | | | 267/221 |
| 9,004,470 | B2 | 4/2015 | Fleniken et al. | |
| 9,022,188 | B2 * | 5/2015 | Lee | F16F 9/36 |
| | | | | 188/322.17 |
| 9,718,322 | B2 * | 8/2017 | Wilkin | B60G 13/08 |
| 9,829,062 | B2 | 11/2017 | Tsunekawa | |

(Continued)

FOREIGN PATENT DOCUMENTS

| | | |
|---|---|---|
| CN | 204828463 U | 12/2015 |
| CN | 111396491 A | 7/2020 |
| CN | 115095625 A | 9/2022 |

(Continued)

*Primary Examiner* — Christopher P Schwartz
(74) *Attorney, Agent, or Firm* — Harness, Dickey & Pierce, P.L.C.

(57) ABSTRACT

An improved oil seal cap for use in a shock absorber for a vehicle including an end wall, and aperture extending through the end wall, and a sidewall extending away from the sidewall in a first direction. The end wall includes a first portion and a second portion, wherein the second portion is raised in a second direction opposite the first direction with respect to the first portion, with the second portion forming a ridge. The oil seal cap is inserted into a reserve tube and cooperates with an oil seal to seal off the top of a shock absorber. The ridge of the end wall is at or above the oil seal and protects the oil seal from impacts of a jounce bumper provided on the shock absorber.

18 Claims, 13 Drawing Sheets

(56)  References Cited

U.S. PATENT DOCUMENTS

2007/0051574 A1*  3/2007  Keil ........................ F16F 9/364
                                                        188/322.18
2012/0181766 A1*  7/2012  Keil ...................... B60G 15/07
                                                        280/124.1

FOREIGN PATENT DOCUMENTS

CN        217873957  U      11/2022
KR        100478908  B1      3/2005
KR        100854601  B1      8/2008

* cited by examiner

DAMPER OIL SEAL CAP WITH SEAL PROTECTION FEATURE

FIELD

The present disclosure relates generally to hydraulic dampers or shock absorbers for use in a suspension system such as a suspension system used for automotive vehicles. More particularly, the present disclosure relates to a hydraulic damper or shock absorber which includes an oil seal cap configured to protect an oil seal from damaging impacts from a jounce bumper.

BACKGROUND

This section provides background information related to the present disclosure which is not necessarily prior art.

Shock absorbers are used in conjunction with automotive suspension systems to absorb unwanted vibrations which occur during driving. To absorb the unwanted vibrations, shock absorbers are generally connected between the sprung portion (body) and the unsprung portion (suspension) of the automobile. A piston is located within a pressure tube of the shock absorber and the pressure tube is connected to one of the sprung portion and the unsprung portion of the vehicle. The piston is connected to the other of the sprung portion and unsprung portion of the automobile through a piston rod which extends through the pressure tube. The piston divides the pressure tube into an upper working chamber and a lower working chamber both of which are filled with hydraulic fluid. Because the piston is able, through valving, to limit the flow of the hydraulic fluid between the upper and the lower working chambers when the shock absorber is compressed or extended, the shock absorber is able to produce a damping force which counteracts the vibration which would otherwise be transmitted from the unsprung portion to the sprung portion of the vehicle. In a dual-tube shock absorber, a fluid reservoir or reserve chamber is defined between the pressure tube and a reserve tube. A base valve is located between the lower working chamber and the reserve chamber to also produce a damping force which counteracts the vibrations which would otherwise be transmitted from the unsprung portion of the vehicle to the sprung portion of the automobile.

As described above, for a dual-tube shock absorber, the valving on the piston limits the flow of damping fluid between the upper and lower working chambers when the shock absorber is extended to produce a damping load. The valving on the base valve limits the flow of damping fluid between the lower working chamber and the reserve chamber when the shock absorber is compressed to produce a damping load. For a mono-tube shock absorber, the valving on the piston limits the flow of damping fluid between the upper and lower working chambers when the shock absorber is extended or compressed to produce a damping load. During driving, the suspension system moves in jounce (compression) and rebound (extension). During jounce movements, the shock absorber is compressed causing damping fluid to move through the base valve in a dual-tube shock absorber or through the piston valve in a mono-tube shock absorber. A damping valve located on the base valve or the piston controls the flow of damping fluid and thus the damping force created. During rebound movements, the shock absorber is extended causing damping fluid to move through the piston in both the dual-tube shock absorber and the mono-tube shock absorber. A damping valve located on the piston controls the flow of damping fluid and thus the damping force created.

In a dual-tube shock absorber, the piston and the base valve normally include a plurality of compression passages and a plurality of extension passages. During jounce movements in a dual-tube shock absorber, the damping valve or the base valve opens the compression passages in the base valve to control fluid flow and produce a damping load. A check valve on the piston opens the compression passages in the piston to replace damping fluid in the upper working chamber but this check valve may or may not contribute to the damping load. The damping valve on the piston closes the extension passages of the piston and a check valve on the base valve closes the extension passages of the base valve during a compression movement. During rebound movements in a dual-tube shock absorber, the damping valve on the piston opens the extension passages in the piston to control fluid flow and produce a damping load. A check valve on the base valve opens the extension passages in the base valve to replace damping fluid in the lower working chamber but this check valve may or may not contribute to the damping load.

In a mono-tube shock absorber, the piston normally includes a plurality of compression passages and a plurality of extension passages. The shock absorber will also include means for compensating for the rod volume flow of fluid as is well known in the art. During jounce movements in a mono-tube shock absorber, the compression damping valve on the piston opens the compression passages in the piston to control fluid flow and produce a damping load. The extension damping valve on the piston closes the extension passages of the piston during a jounce movement. During rebound movements in a mono-tube shock absorber, the extension damping valve on the piston opens the extension passages in the piston to control fluid flow and produce a damping load. The compression damping valve on the piston closes the compression passages of the piston during a rebound movement.

Shock absorbers typically include an elastomeric jounce bumper which is disposed around the piston rod. During maximum compression of the shock absorber, the elastomeric jounce bumper contacts a jounce bumper cap or an external bumper plate which is attached to the shock absorber. Continued compression of the shock absorber compresses the elastomeric jounce bumper to dissipate energy. The jounce bumper cap or the external bumper plate is configured to protect the upper end of the shock absorber tubes and the seal assembly for the piston rod. In some situations, the jounce bumper cap and/or the external bumper plate may come loose or break off of the upper end of the shock absorber, and thus fail to continue to protect the upper end of the shock absorber tubes and the seal assembly for the piston rod.

SUMMARY

This section provides a general summary of the disclosure, and is not a comprehensive disclosure of its full scope or all of its features.

In accordance with one aspect of the subject disclosure, an improved oil seal cap for use in a shock absorber for a vehicle is provided. The oil seal cap includes an end wall, and aperture extending through the end wall, and a circumferential sidewall extending away from the sidewall in a first direction. The end wall includes a first portion and a second portion, wherein the second portion of the end wall is raised in a second direction opposite the first direction with respect to the first portion of the end wall, with the second portion forming a ridge. The second portion is radially located between the aperture and the first portion of the end wall. The oil seal cap is inserted into a reserve tube, and cooperates with an oil seal to seal off the top of a shock absorber. The ridge of the end wall is at or above the oil seal and protects the oil seal from impacts of a jounce bumper provided on the shock absorber. In some aspects, the ridge is perpendicular to the sidewall and provides a flat surface against which the jounce bumper is configured to contact. In other aspects, the ridge is at an angle with respect to the sidewall. In some aspects, the sidewall of the oil seal cap may have an upper sidewall portion and a lower sidewall portion with differing inner and outer diameters. For example, the lower sidewall portion may be sized to fit different shock absorber size while the size of the upper sidewall portion may be held constant so that a particular sized oil seal can be used across many different shock absorber sizes.

In accordance with one aspect of the subject disclosure, an improved piston design for use in a shock absorber for a vehicle is provided. The shock absorber includes a pressure tube, a piston rod extending within the pressure tube along a longitudinal axis; a piston assembly slidably fitted in the pressure tube for movement along the longitudinal axis, a reserve tube surrounding the pressure tube, the reserve tube having a reserve tube inner diameter, an oil seal cap coupled to the reserve tube, an oil seal, and a rod guide. The oil seal cap includes an end wall and a circumferential sidewall extending longitudinally from the end wall along the longitudinal axis, wherein the sidewall terminates in a sidewall end surface. The end wall includes an end wall inner surface, an end wall outer surface, a first end wall portion, a second end wall portion, and an aperture extending through the end wall. The first end wall portion includes a first inner annular surface and a first outer annular surface, and the second end wall portion includes a second inner annular surface and a second outer annular surface. The sidewall has a sidewall outer diameter that is equal to or less than the reserve tube inner diameter, and at least a portion of the sidewall is located within the reserve tube. The first outer annular surface is located a first distance away from the sidewall end surface and the second outer annular surface is located a second distance away from the sidewall end surface, wherein the second distance is greater than the first distance. At least a portion of the oil seal is in contact with the end wall inner surface of the oil seal cap wherein the oil seal is at or axially offset from the second outer annular surface of the oil seal cap toward the sidewall end surface. The oil seal is located between the rod guide and the oil seal cap.

In accordance with one aspect of the subject disclosure, a shock absorber for a vehicle is provided. The shock absorber includes a pressure tube, a piston rod, at least a portion of which extends within the pressure tube along a longitudinal axis, a jounce bumper through which at least a portion of the piston rod extends, a piston assembly slidably fitted in the pressure tube for movement along the longitudinal axis, an oil seal cap, an oil seal, and a reserve tube. The oil seal cap includes an end wall having an end wall inner surface and an end wall outer surface, an aperture extending through the end wall; and a circumferential sidewall extending longitudinally from the end wall in a first direction, wherein a portion of the end wall includes a ridge extending longitudinally in a second direction opposite the first direction. The oil seal is in contact with the end wall inner surface. The oil seal cap is longitudinally between the jounce bumper and the oil seal. The oil seal is at or axially offset from the ridge of the oil seal cap in the first direction. The ridge of the oil seal cap prevents the jounce bumper from contacting the oil seal during certain compression strokes of the shock absorber. The reserve tube surrounds the pressure tube and at least a portion of the sidewall of the oil seal cap is located within a portion of the reserve tube.

In accordance with another aspect of the subject disclosure, a shock absorber for a vehicle is provided. The shock absorber includes a pressure tube, a piston rod extending within the pressure tube along a longitudinal axis, a piston assembly slidably fitted in the pressure tube for movement along the longitudinal axis, a reserve tube surrounding the pressure tube, an oil seal cap coupled to the reserve tube, an oil seal, and a rod guide. The oil seal cap includes an end wall, an aperture extending through the end wall, wherein the piston rod extends through the aperture, and a circumferential sidewall. The end wall has an end wall inner surface and an end wall outer surface, wherein the end wall inner surface includes a first inner surface and a second inner surface and the end wall outer surface includes a first outer surface and a second outer surface. The second inner surface is a first longitudinal distance away from the first inner surface and the second outer surface is a second longitudinal distance away from the first outer surface. The sidewall extends longitudinally from the end wall, wherein at least a portion of the sidewall is received within the reserve tube, and wherein at least a portion of the reserve tube surrounds at least a portion of the sidewall. The oil seal has a seal body including a lower annular seal lip surrounding the piston rod, an upper annular seal lip surrounding the piston rod, wherein the upper annular seal lip does not extend longitudinally beyond the second outer surface of the oil seal cap, an upper rim in contact with the end wall inner surface of the oil seal cap, and an upper annular surface, wherein there is a gap between the upper annular surface and the second inner surface of the end wall. The rod guide has a shoulder in contact with at least a portion of the oil seal, wherein the rod guide is in contact with the pressure tube opposite the oil seal, and wherein the oil seal is longitudinally sandwiched between the oil seal cap and the rod guide.

Further areas of applicability will become apparent from the description provided herein. The description and specific examples in this summary are intended for purposes of illustration only and are not intended to limit the scope of the present disclosure.

BRIEF DESCRIPTION OF DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
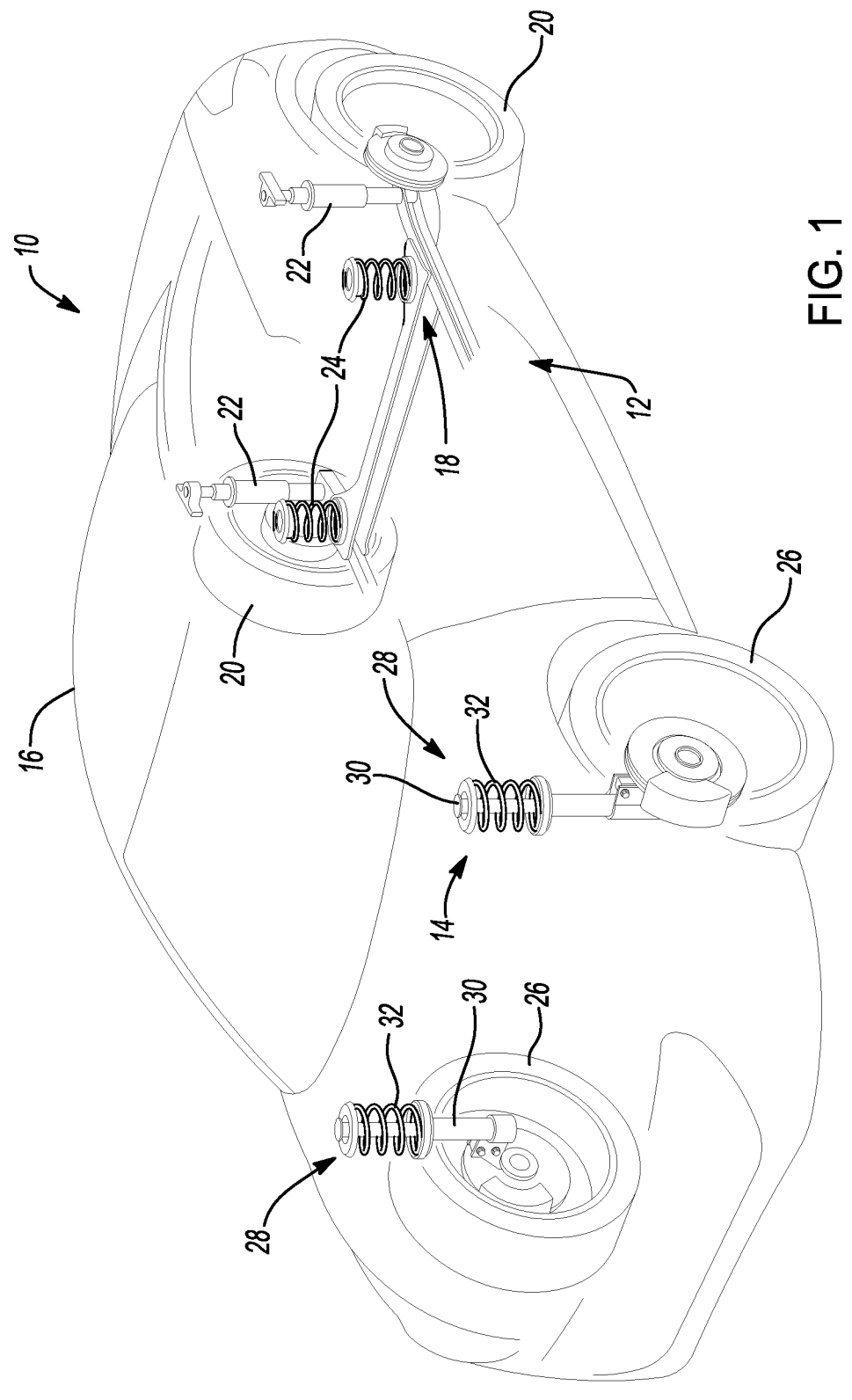
FIG. 1 is an illustration of an automobile using the shock absorber in accordance with the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring to FIG. 1, an exemplary vehicle 10 including a rear suspension 12, a front suspension 14, and a body 16 is illustrated. Exemplary rear suspension 12 has a torsion beam assembly 18 configured to operatively support the vehicle's rear wheels 20. The torsion beam assembly 18 assembly is operatively connected to body 16, and includes a pair of shock absorbers 22 and a pair of helical coil springs 24. Similarly, the front suspension 14 includes a transversely extending front axle assembly (not shown) configured to operatively support the vehicle's front wheels 26. The front axle assembly is operatively connected to the body 16 by a pair of corner assemblies 28, which include a pair of shock absorbers 30 and by a pair of shaped helical coil springs 32. Shock absorbers 22 and 30 serve to dampen the relative motion of the unsprung portion (i.e., the front and rear suspensions 14 and 12, respectively) and the sprung portion (i.e., the body 16) of the vehicle 10. While the vehicle 10 has been depicted as a passenger car having front and rear axle assemblies, the shock absorbers 22 and 30 may be used with other types of vehicles and/or in other types of applications such as vehicles incorporating independent front and/or independent rear suspension systems. Further, the term "shock absorber" as used herein is meant to be dampers in general and thus will include struts. Also, while the front suspension 14 is illustrated having a pair of struts or shock absorbers 30, it is within the scope of the present invention to have the rear suspension 12 incorporate a pair of struts or shock absorbers 30 if desired.

Figures 2, 3:
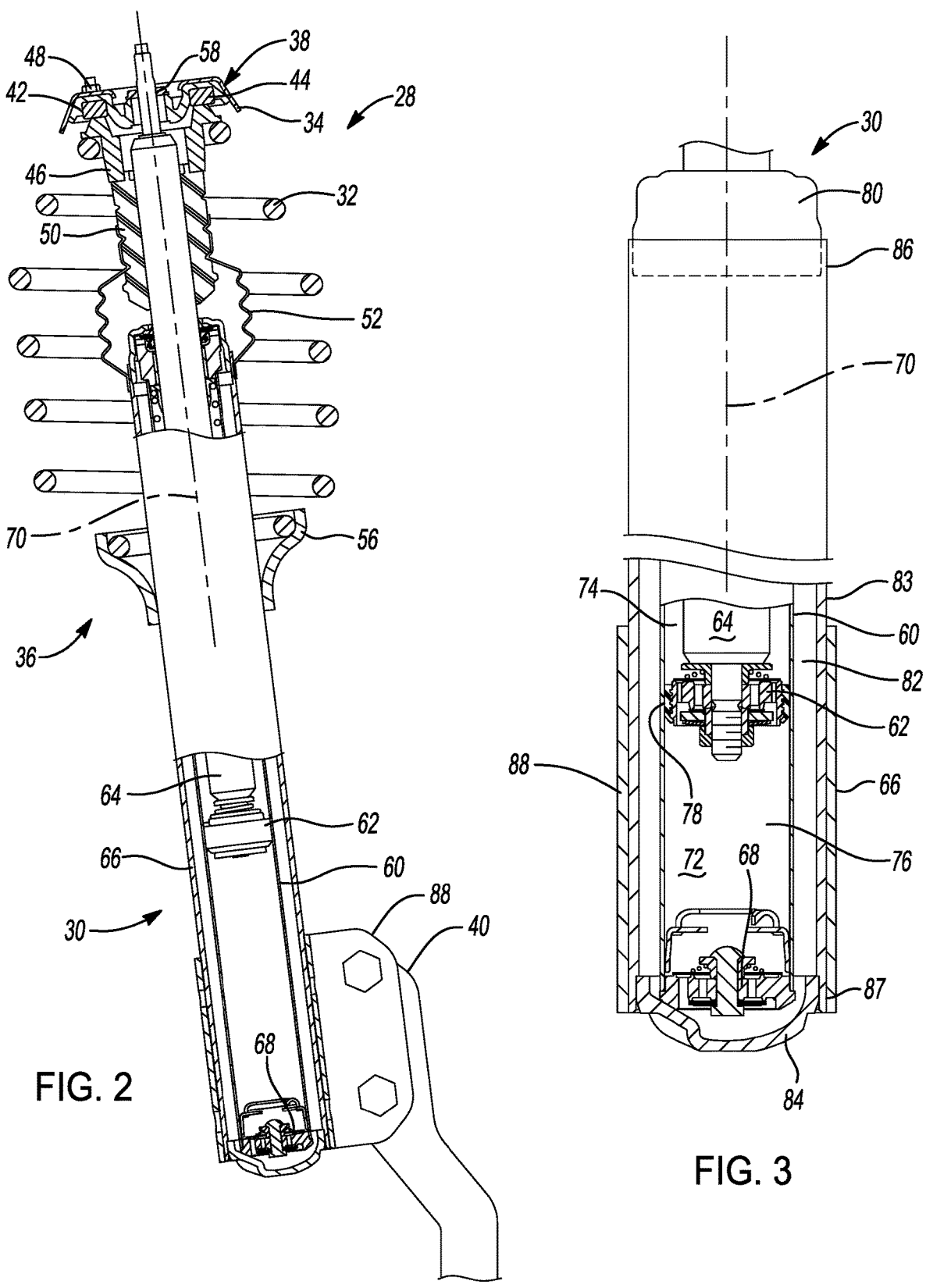
FIG. 2 is a side view of a corner assembly that incorporates a shock absorber in accordance with the present disclosure.
FIG. 3 is a side sectional view of the shock absorber of FIG. 2.

Referring now to FIG. 2, the front corner assembly 28 for the vehicle 10 is illustrated in greater detail. The body 16 of the vehicle 10 defines a shock tower 34 within which is mounted a strut assembly 36 that comprises a telescoping device in the form of the shock absorber 30, the coil spring 32, a top mount assembly 38, and a knuckle 40. The strut assembly 36 including the shock absorber 30, the coil spring 32, and the top mount assembly 38 are attached to the vehicle 10 using the shock tower 34. The top mount assembly 38 comprises a top mount 42, a bearing assembly 44, and an upper spring seat 46. The top mount 42 comprises an integral molded body and a rigid body member, typically made of stamped steel. The top mount assembly 38 is mounted to the shock tower 34 by bolts or studs 48. The bearing assembly 44 is friction fit within the molded body of the top mount 42 to be seated in the top mount 42 so that one side of the bearing assembly 44 is fixed relative to the top mount 42 and the shock tower 34. The second side of the bearing assembly 44 freely rotates with respect to the first side of the bearing assembly 44, top mount 42 and shock tower 34.

The free rotating side of the bearing assembly 44 carries the upper spring seat 46 that is clearance fit to the outer diameter of the bearing assembly 44. An elastomeric jounce bumper 50 is disposed between the upper spring seat 46 and the shock absorber 30. The jounce bumper 50 comprises an elastomeric material which is protected by a plastic dirt shield 52.

A lower spring seat 56 is attached to the shock absorber 30 and the coil spring 32 is disposed between the upper spring seat 46 and the lower spring seat 56 to isolate the body 16 from the front suspension 14. While the shock absorber 30 is illustrated in FIG. 2, it is to be understood that the shock absorber 22 may also include the features described herein for the shock absorber 30.

Prior to the assembly of strut assembly 36 into vehicle 10, the pre-assembly of strut assembly 36 is performed. The jounce bumper 50 and the plastic dirt shield 52 are assembled to the shock absorber 30. The coil spring 32 is assembled over the shock absorber 30 and positioned within the lower spring seat 56. The upper spring seat 46 is assembled onto the shock absorber 30 and correctly positioned with respect to the coil spring 32. The bearing assembly 44 is positioned on top of the upper spring seat 46 and the top mount 42 is positioned on top of the bearing assembly 44. This entire assembly is positioned within an assembly machine that compresses the coil spring 32 such that the end of the shock absorber 30 extends through a bore located within top mount assembly 38. A retaining nut 58 is threadingly received on the end of the shock absorber 30 to secure the assembly of the strut assembly 36.

The top mount 42 is designed as an identical component for the right and left hand sides of the vehicle 10 but it has a different orientation with respect to the shock absorber 30 and its associated bracketry when it is placed on the right or left side of the vehicle 10.

Referring now to FIGS. 2 and 3, additional details of the shock absorber 30 are shown. While FIG. 3 illustrates only the shock absorber 30, it is to be understood that the shock absorber 22 could also be a part of a strut assembly and include the reinforcement described below for the shock absorber 30. The shock absorber 30 comprises a pressure tube 60, a piston assembly 62, a piston rod 64, a reserve tube assembly 66, and a base valve assembly 68. The pressure tube 60, piston rod 64, and reserve tube assembly 66 extend co-axially along a longitudinal axis 70. The piston rod 64 extends through the jounce bumper 50, with the jounce bumper 50 surrounding at least a portion of the piston rod 64.

The pressure tube 60 defines a fluid chamber 72. The piston assembly 62 is slidably disposed within the pressure tube 60 and divides the fluid chamber 72 into an upper working chamber 74 and a lower working chamber 76. A piston band 78 is disposed between the piston assembly 62 and the pressure tube 60 to permit sliding movement of the piston assembly 62 with respect to the pressure tube 60 without generating undue frictional forces as well as sealing the upper working chamber 74 from the lower working chamber 76. The piston rod 64 is attached to the piston assembly 62 and extends through the upper working chamber 74 and through an oil seal cap 80 (also referred to as an upper end cap), which closes the upper end of pressure tube 60. A sealing system (described in greater detail below) seals the interface between the oil seal cap 80, the reserve tube assembly 66, and the piston rod 64. The end of the piston rod 64 opposite to the piston assembly 62 is adapted to be secured to the top mount assembly 38 and to the sprung portion of the vehicle 10 as discussed above. Valving within the piston assembly 62 controls the movement of fluid between the upper working chamber 74 and the lower working chamber 76 during movement of the piston assembly 62 within the pressure tube 60. Because the piston rod 64 extends only through the upper working chamber 74 and not the lower working chamber 76, movement of the piston assembly 62 with respect to the pressure tube 60 causes a difference in the amount of fluid displaced in the upper working chamber 74 and the amount of fluid displaced in the lower working chamber 76. The difference in the amount of fluid displaced is known as the "rod volume" and it flows through the base valve assembly 68.

The reserve tube assembly 66 surrounds the pressure tube 60 to define a fluid reservoir chamber 82 located between pressure tube 60 and reserve tube assembly 66. The reserve tube assembly 66 includes a reserve tube 83 and a base cup 84. The reserve tube 83 has a top end 86 and a bottom end 87. The oil seal cap 80 is coupled to the top end 86 of the reserve tube 83. The base cup 84 is coupled to the bottom end 87 of the reserve tube 83 and closes the reserve tube 83 and the reserve tube assembly 66. While the base cup 84 is illustrated as a separate component, it is within the scope of the present disclosure to have the base cup 84 integral with reserve tube 83. The lower end of the reserve tube assembly 66 includes a bracket 88 that interfaces with the knuckle 40.

The base valve assembly 68 is disposed between the lower working chamber 76 and the fluid reservoir chamber 82 to control the flow of fluid between the lower working chamber 76 and the fluid reservoir chamber 82. When the shock absorber 30 extends in length, an additional volume of fluid is needed in the lower working chamber 76 due to the "rod volume" concept. Thus, fluid will flow from the fluid reservoir chamber 82 to the lower working chamber 76 through the base valve assembly 68 as detailed below. When the shock absorber 30 compresses in length, an excess of fluid must be removed from the lower working chamber 76 due to the "rod volume" concept. Thus, fluid will flow from the lower working chamber 76 to the fluid reservoir chamber 82 through the base valve assembly 68 as detailed below.

Figures 4, 5:
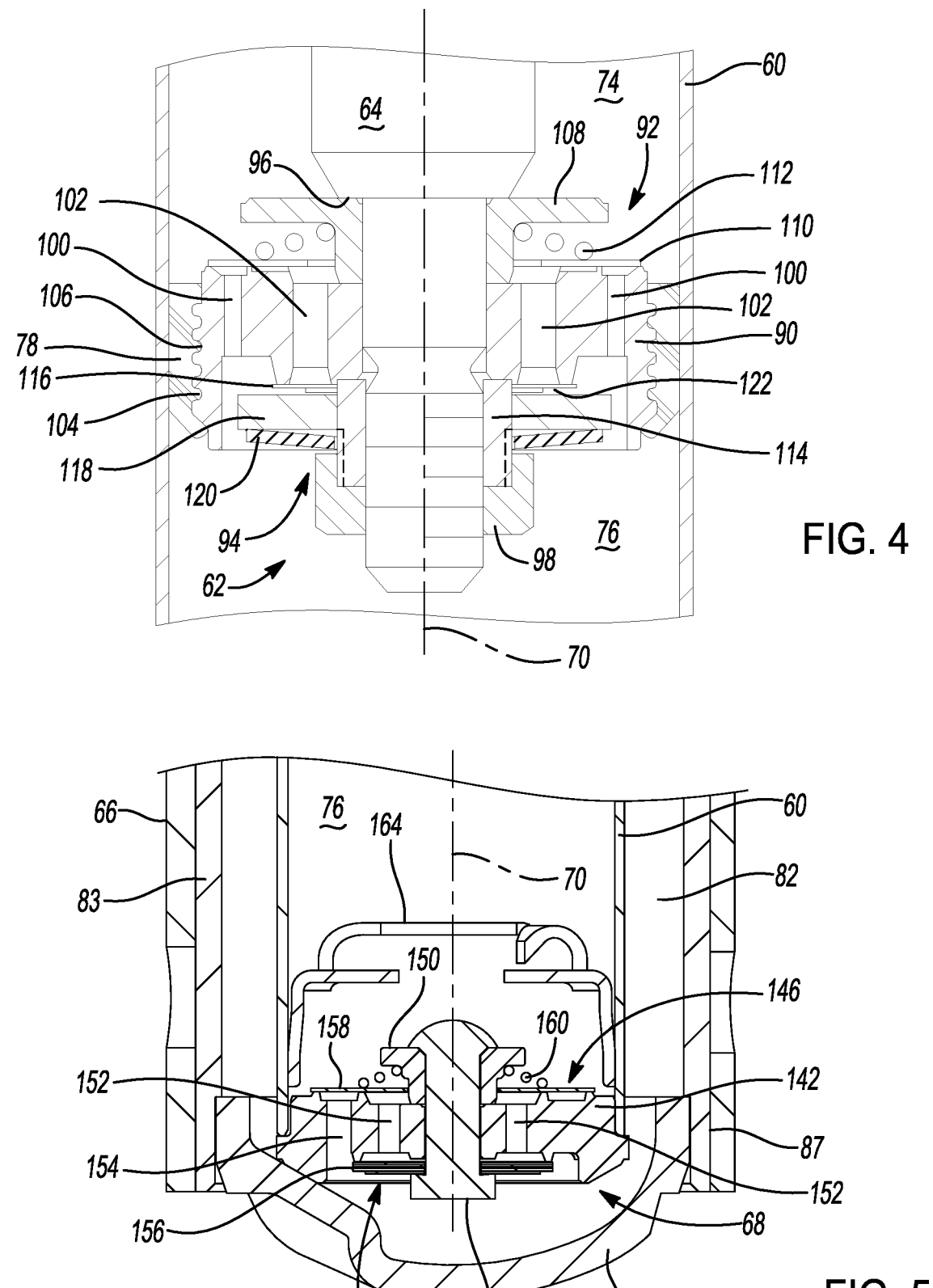
FIG. 4 is an enlarged side view, partially in cross-section, of the piston assembly from the shock absorber illustrated in FIG. 3.
FIG. 5 is an enlarged side view, in cross-section of the base valve assembly from the shock absorber illustrated in FIG. 3.

Referring now to FIG. 4, the piston assembly 62 comprises a piston body 90, a compression valve assembly 92, and a rebound valve assembly 94. The compression valve assembly 92 is assembled against a shoulder 96 on the piston rod 64. The piston body 90 is assembled against the compression valve assembly 92 and the rebound valve assembly 94 is assembled against the piston body 90. A nut 98 secures these components to the piston rod 64.

The piston body 90 defines a plurality of compression passages 100 and a plurality of rebound passages 102. The piston band 78 includes a plurality of ribs 104 which mate with a plurality of annular grooves 106 in the piston body 90 to restrict sliding movement of the piston band 78 relative to the piston body 90 as the piston assembly 62 slides in the pressure tube 60.

In an example embodiment, the compression valve assembly 92 comprises a retainer 108, one or more valve discs 110, and a spring 112. The retainer 108 abuts the shoulder 96 on one end and the piston body 90 on the other end. The one or more valve discs 110 abut piston body 90 and close the compression passages 100 while leaving the rebound passages 102 open. The spring 112 is disposed between the retainer 108 and the valve discs 110 to bias the valve discs 110 against the piston body 90. During a compression stroke, fluid in the lower working chamber 76 is pressurized causing fluid pressure to react against the one or more valve discs 110. When the fluid pressure against the one or more valve discs 110 overcomes the biasing load of the spring 112, the one or more valve discs 110 separate from the piston body 90 to open the compression passages 100 and allow fluid flow from the lower working chamber 76 to the upper working chamber 74. The damping characteristics for the shock absorber 30 during a compression stroke of the shock absorber 30 can be controlled by the compression valve assembly 92 and/or the base valve assembly 68, which accommodates the flow of fluid from the lower working chamber 76 to the fluid reservoir chamber 82 due to the "rod volume" concept as detailed below. During a rebound stroke, the compression passages 100 are closed by the one or more valve discs 110.

In an example embodiment, the rebound valve assembly 94 comprises a spacer 114, one or more valve discs 116, a retainer 118, and a spring 120. The spacer 114 is threadingly received on the piston rod 64 and is disposed between the piston body 90 and the nut 98. The spacer 114 retains the piston body 90 and the compression valve assembly 92 while permitting the tightening of the nut 98 without compressing either the one or more valve discs 110 or the one or more valve discs 116. The retainer 108, the piston body 90, and the spacer 114 provide a continuous solid connection between the shoulder 96 and the nut 98 to facilitate the tightening and securing of the nut 98 to the spacer 114 and thus to the piston rod 64. The one or more valve discs 116 are slidingly received on the spacer 114 and abut the piston body 90 to close the rebound passages 102 while leaving the compression passages 100 open. The retainer 118 is also slidingly received on the spacer 114 and it abuts the one or more valve discs 116.

The spring 120 is assembled over the spacer 114 and is disposed between the retainer 118 and the nut 98 which is threadingly received on the spacer 114. The spring 120 biases the retainer 118 against the one or more valve discs 116 and the one or more valve discs 116 against the piston body 90. The one or more valve discs 116 include at least one slot 122 that permits a limited amount of bleed flow bypassing the rebound valve assembly 94. When fluid pressure is applied to the one or more valve discs 116, they will elastically deflect at the outer peripheral edge to open the rebound valve assembly 94. A shim (not shown) may be located between the nut 98 and the spring 120 to control the preload for the spring 120 and thus the blow off pressure as described below. Thus, the calibration for the blow off feature of the rebound valve assembly 94 is separate from the calibration for the compression valve assembly 92.

During a rebound stroke, fluid in the upper working chamber 74 is pressurized causing fluid pressure to react against the valve discs 116. When the fluid pressure reacting against the valve discs 116 overcomes the bending load for the valve discs 116, the valve discs 116 elastically deflect, opening the rebound passages 102 and allowing fluid flow from the upper working chamber 74 to the lower working chamber 76. The strength of the valve discs 116 and the size of the rebound passages 102 will determine the damping characteristics for the shock absorber 30 in rebound. Prior to the deflection of the valve discs 116, a controlled amount of fluid flows from the upper working chamber 74 to the lower working chamber 76 through the slot 122 to provide low speed tunability. When the fluid pressure within the upper working chamber 74 reaches a predetermined level, the fluid pressure will overcome the biasing load of the spring 120 causing axial movement of the retainer 118 and the one or more valve discs 116. The axial movement of the retainer 118 and the valve discs 116 fully opens the rebound passages 102 thus allowing the passage of a significant amount of damping fluid creating a blowing off of the fluid pressure which is required to prevent damage to the shock absorber 30 and/or the vehicle 10. Additional fluid required to be added to the lower working chamber 76 due to the "rod volume" concept will flow through the base valve assembly 68.

Referring to FIG. 5, in an example embodiment, the base valve assembly 68 comprises a valve body 142, a compression valve assembly 144, and a check valve assembly 146. The compression valve assembly 144 and the check valve assembly 146 are attached to the valve body 142, for example, using a bolt 148 and a nut 150. The tightening of the nut 150 biases the compression valve assembly 144 towards the valve body 142. In some embodiments, a rivet may be used in place of the bolt 148 and the nut 150. The valve body 142 defines one or more compression passages 152 and one or more rebound passages 154.

In an example embodiment, the compression valve assembly 144 one or more valve discs 156 that are biased against the valve body 142 by the bolt 148 and the nut 150. During a compression stroke, fluid in the lower working chamber 76 is pressurized and the fluid pressure within the compression passages 152 will eventually open the compression valve assembly 144 by deflecting the one or more valve discs 156. The compression valve assembly 92 of the piston assembly 62 will allow fluid flow from the lower working chamber 76 to the upper working chamber 74 and only the "rod volume" of fluid will flow through the compression valve assembly 144. The damping characteristics for the shock absorber 30 can be controlled by the design of the compression valve assembly 144 of the base valve assembly 68 and can also be controlled by the design of the compression valve assembly 92.

In an example embodiment, the check valve assembly 146 comprises one or more valve discs 158 and a valve spring 160. The one or more valve discs 158 abut the valve body 142 and close the one or more rebound passages 154. The valve spring 160 is disposed between the nut 150 and the one or more valve discs 158 to bias the one or more valve discs 158 against the valve body 142. During a rebound stroke, fluid in the lower working chamber 76 is reduced in pressure, causing fluid pressure in the fluid reservoir chamber 82 to react against the one or more valve discs 158. When the fluid pressure against the one or more valve discs 158 overcomes the biasing load of the valve spring 160, the one or more valve discs 158 separate from the valve body 142 to open the rebound passages 154 and allow fluid flow from the fluid reservoir chamber 82 to the lower working chamber 76. The damping characteristics for a rebound stroke can be controlled by the design of the rebound valve assembly 94.

With continued reference to FIG. 5, in some embodiments, the base valve assembly 68 further includes a hood 164. The hood 164 is located in the lower working chamber 76 between the piston assembly 62 and the base valve assembly 68. The hood 164 at least partially covers the base valve assembly 68. The hood 164 includes one or more openings through which fluid may flow to and from the base valve assembly 68.

Figures 6, 7:
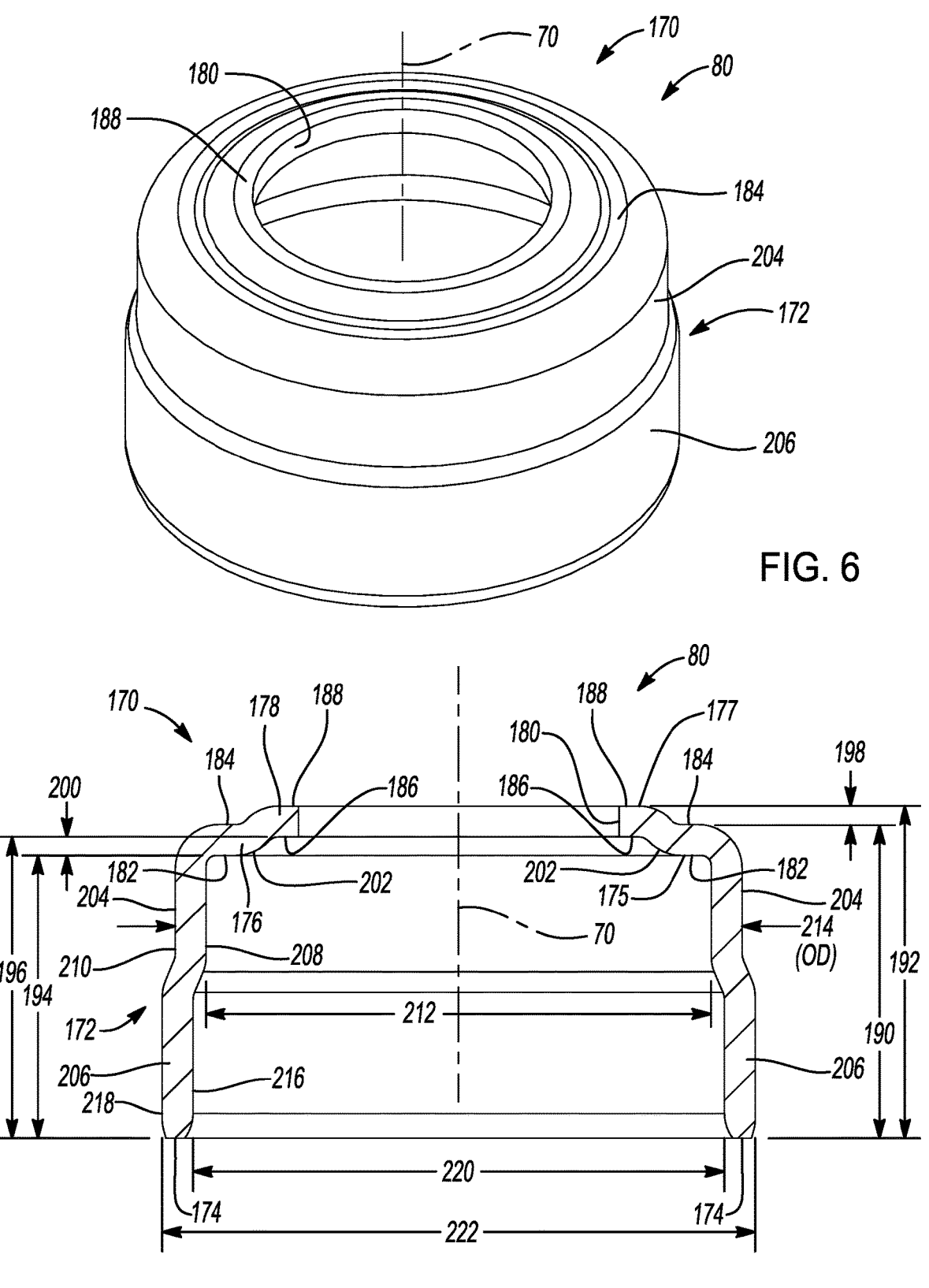
FIG. 6 is a perspective view of an embodiment of an oil seal cap in accordance with the present disclosure.
FIG. 7 is a side view, in cross-section of the oil seal cap of FIG. 6.

Referring now to FIGS. 6 and 7, an embodiment of the oil seal cap 80 is shown and described. The oil seal cap 80 includes an end wall 170 and a circumferential sidewall 172 extending longitudinally from the end wall 170 along the longitudinal axis 70. The sidewall 172 terminates in a sidewall end surface 174. The end wall 170 includes an inner surface 175, an outer surface 177, a first end wall portion 176, a second end wall portion 178 connected to the first end wall portion 176, and an aperture 180 extending through the end wall 170. Each of the first end wall portion 176 and the second end wall portion 178 are located radially around the aperture 180, with the first end wall portion 176 located radially between the second end wall portion 178 and the sidewall 172 and the second end wall portion 178 located radially between the aperture 180 and the first end wall portion 176. The second end wall portion 178 is raised along the longitudinal axis 70 with respect to the first end wall portion 176 away from the sidewall 172. The second end wall portion 178 may also be considered a circumferentially extending ridge positioned axially offset from the first end wall portion 176. Ridge or second end wall portion 178 axially extends from first end wall portion 176 in a direction away from the sidewall end surface 174.

The first end wall portion 176 includes a first inner annular surface 182 and a first outer annular surface 184. The second end wall portion 178 includes a second inner annular surface 186 and a second outer annular surface 188. The first outer annular surface 184 is located a first distance 190 away from the sidewall end surface 174 and the second outer annular surface 188 is located a second distance 192 away from the sidewall end surface 174, wherein the second distance 192 is greater than the first distance 190. The first inner annular surface 182 is located a third distance 194 away from the sidewall end surface 174, wherein the third distance 194 is less than the first distance 190 and the second distance 192. The second inner annular surface 186 is located a fourth distance 196 away from the sidewall end surface 174, wherein the fourth distance 196 is greater than the third distance 194 but less than the second distance 192. As shown in FIG. 7, In some embodiments, the fourth distance 196 is less than the first distance 190. In some embodiments, the fourth distance 196 is equal to the first distance 190. In some embodiments, the fourth distance 196 greater than the first distance 190. Additionally, the second outer annular surface 188 is located a fifth distance 198 away from the first outer annular surface 184. The fifth distance 198 is the difference between the second distance 192 and the first distance 190. The second inner annular surface 186 is located a sixth distance 200 away from the first inner annular surface 182. The sixth distance 200 is the difference between the fourth distance 196 and the third distance 194. In some embodiments the fifth distance 198 is equal to the sixth distance 200.

As shown in FIG. 7, the first inner annular surface 182, the first outer annular surface 184, the second inner annular surface 186, and the second outer annular surface 188 are oriented perpendicular to the longitudinal axis 70. The first inner annular surface 182, the first outer annular surface 184, the second inner annular surface 186, and the second outer annular surface 188 are parallel to one another.

The end wall 170 further includes an inner transition surface 202 located between the first inner annular surface 182 and the second inner annular surface 186. As shown in FIG. 7, in some embodiments, the inner transition surface 202 is curved. The inner surface 175 of the end wall 170 includes the first inner annular surface 182, the second inner annular surface 186, and the inner transition surface 202. The outer surface 177 of the end wall 170 includes the first outer annular surface 184 and the second outer annular surface 188.

With continued reference to FIGS. 6 and 7, in some embodiments, the sidewall 172 of the oil seal cap 80 includes a first sidewall portion 204 and a second sidewall portion 206 connected to the first sidewall portion 204. The first sidewall portion 204 is proximate to the end wall 170 and is located between the end wall 170 and the second sidewall portion 206. The first sidewall portion includes a first sidewall inner surface 208 and a first sidewall outer surface 210. The first sidewall portion 204 has a first inner diameter 212 defined by the first sidewall inner surface 208 and a first outer diameter 214 defined by the first sidewall outer surface 210. The second sidewall portion 206 includes a second sidewall inner surface 216 and a second sidewall outer surface 218. The second sidewall portion 206 has a second inner diameter 220 defined by the second sidewall inner surface 216 and a second outer diameter 222 defined by the second sidewall outer surface 218. The second outer diameter 222 is sized to enable the oil seal cap 80 to fit within the reserve tube 83. The size of the second sidewall portion 206 can modified to fit different sized reserve tubes 83, without having to change the size of the end wall 170 and/or the first sidewall portion 204 of the oil seal cap 80. This may allow for a particular or standard sized oil seal to be used across many different sizes of shock absorber 30.

As shown in FIG. 7, in some embodiments, the first inner diameter 212 is less than the second inner diameter 220 and the first outer diameter 214 is less than the second outer diameter 222. In some embodiments, the second inner diameter 220 is less than the first outer diameter 214. In some embodiments, the second inner diameter 220 is less than the first inner diameter 212 and the second outer diameter 222 is less than the first outer diameter 214. Although the sidewall 172 is shown as having a first sidewall portion 204 and a second sidewall portion 206 having different inner and outer diameters, in some embodiments, the sidewall 172 has a constant inner and outer diameter along its entire length. In such embodiments, the sidewall 172 may be considered to have only the first sidewall portion 204. Additionally, in such embodiments, the first outer diameter 214 is sized to enable the oil seal cap 80 to fit within the reserve tube 83.

The oil seal cap 80 may be produced from a metal (e.g., carbon steel) blank using one or more forming operations. For example, a first forming operation may form the end wall 170 and the sidewall 172, a second forming operation may form the raised second end wall portion 178, a third forming operation may cut the aperture 180 in the end wall 170, and, if desired, a fourth forming operation may size the second inner diameter 220 and/or the second outer diameter 222. In some embodiments, the end wall 170, the sidewall 172, the raised second end wall portion 178, and the aperture 180 in the end wall 170 may be formed in a single forming operation. In some embodiments, the end wall 170, the sidewall 172, the raised second end wall portion 178, and the aperture 180 in the end wall 170, the first inner diameter 212, the first outer diameter 214, the second inner diameter 220, and the second outer diameter 222 may be formed in a single forming operation.

Figure 8A:
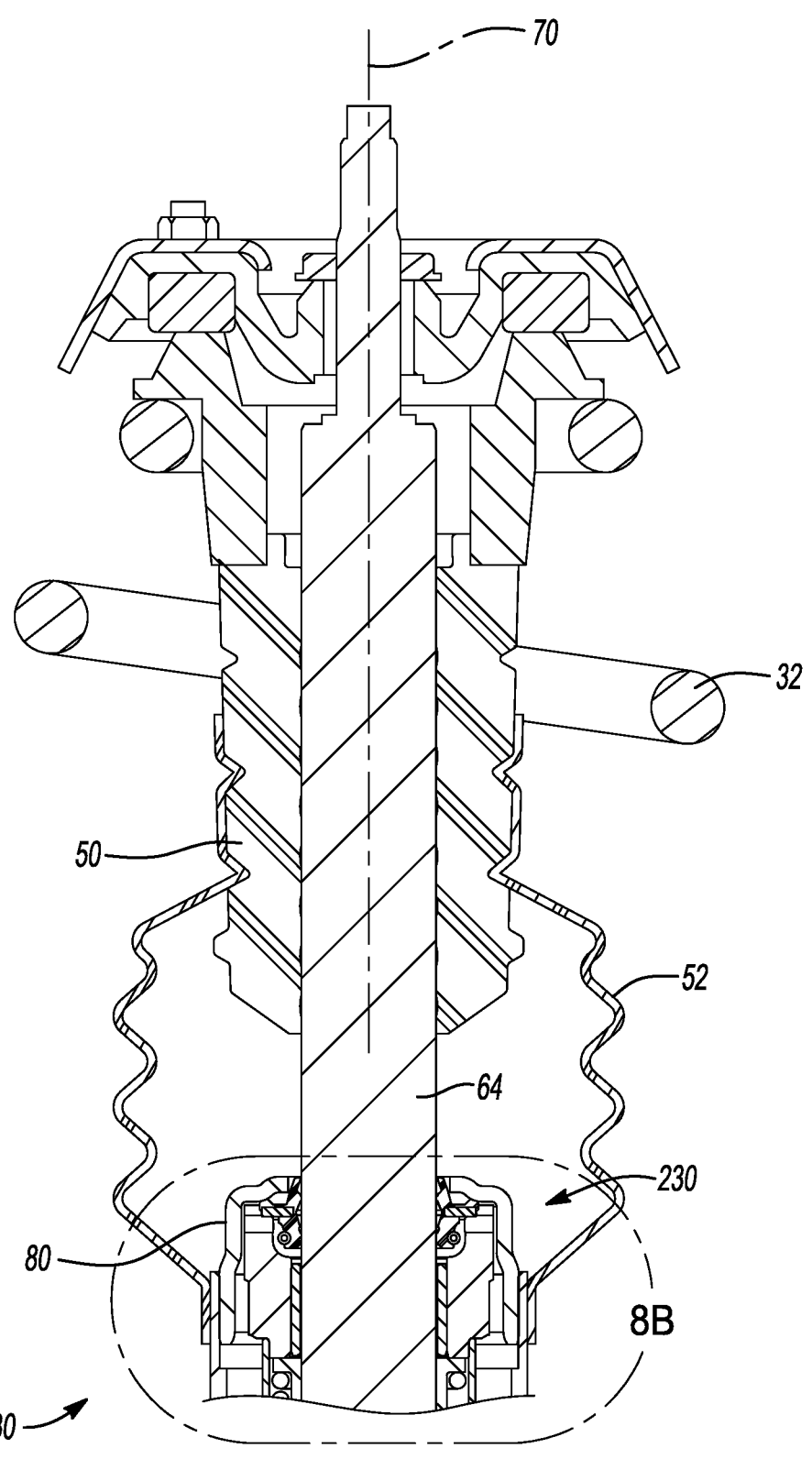
FIG. 8A is an enlarged side view, in cross-section of the elastomeric jounce bumper and the sealing system for the shock absorber in FIG. 3.
Figure 8B:
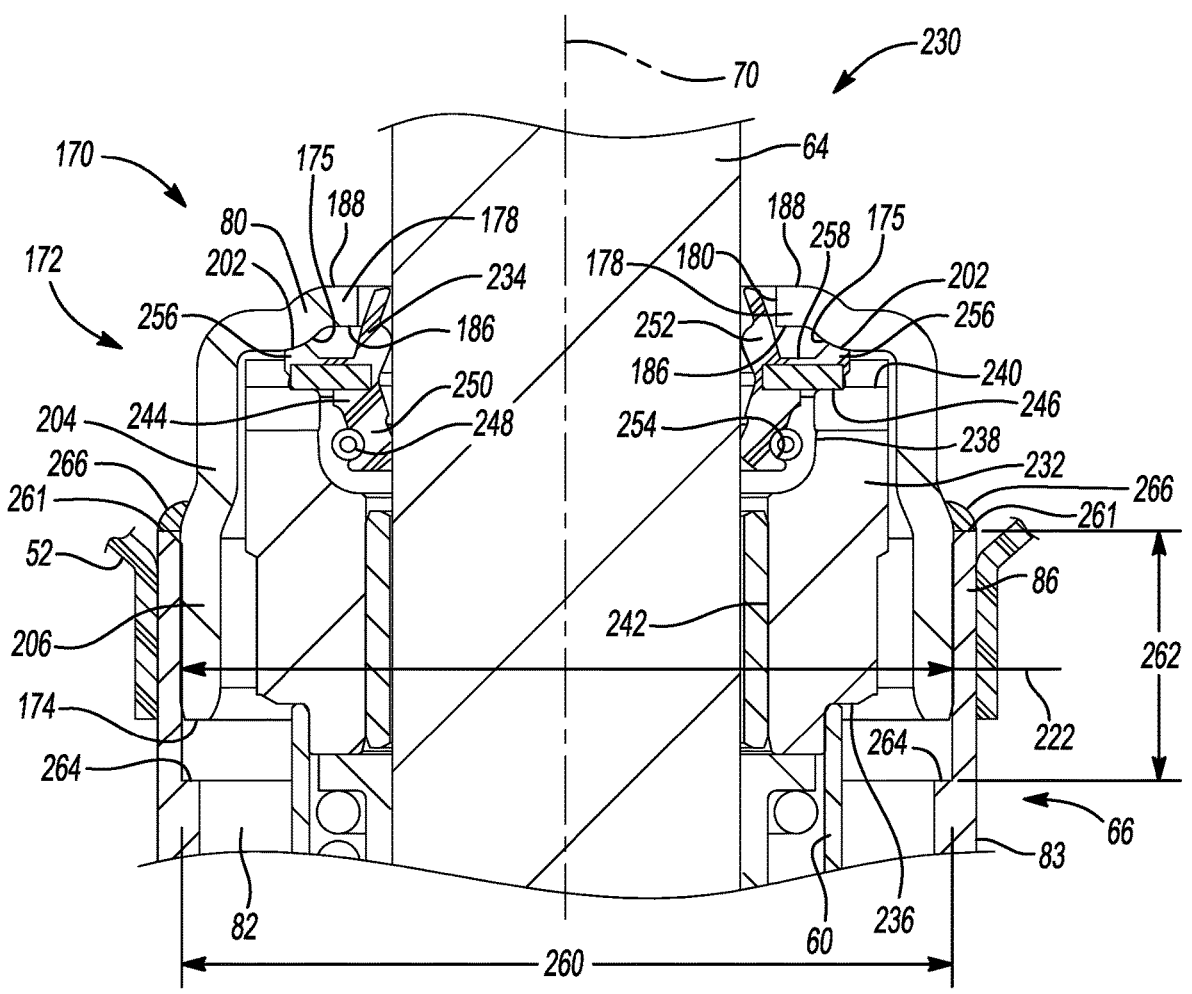
FIG. 8B is an enlarged side view, in cross-section of the sealing system the shock absorber in FIG. 8A.

With reference to FIGS. 8A and 8B, additional details of an embodiment of the shock absorber 30 are shown and described. The shock absorber 30 includes a sealing system 230 comprising the oil seal cap 80, a rod guide 232, and an oil seal 234.

The rod guide 232 closes the upper end of the pressure tube 60 and cooperates with the oil seal cap 80 to close the upper end of the reserve tube assembly 66. The pressure tube 60 is assembled against a shoulder 236 on the lower end of the rod guide 232. The rod guide 232 includes a recessed region 238 extending from the upper end of the rod guide 232 toward the lower end of the rod guide 232, wherein the recessed region 238 is configured to receive at least a portion of the oil seal 234 therein. The rod guide 232 further includes a recessed annular shoulder 240 extending from the upper end of the rod guide 232 toward the lower end of the rod guide 232, wherein the recessed annular shoulder 240 is configured to press a portion of the oil seal 234 against the oil seal cap 80. The rod guide 232 includes an aperture 242 through which the piston rod 64 extends.

The oil seal 234 includes a seal body 244, a positioning ring 246, and a spring 248. The positioning ring 246 is a metal or a plastic positioning ring which may be seated on the annular shoulder 240 defined by the rod guide 232. The seal body 244 is an elastomeric seal. The positioning ring 246 can be a separate component or the positioning ring 246 can be bonded to or integrally molded with the seal body 244 during or after the molding operation for the oil seal 234. The seal body 244 includes a lower annular seal lip 250, an upper annular seal lip 252, a groove 254, and an upper rim 256. The lower annular seal lip 250 engages the piston rod 64 at a position below the shoulder 240 of the rod guide 232 and the upper annular seal lip 252 engages the piston rod 64 at a position above the shoulder 240 of the rod guide 232. The groove 254 is located radially outward from lower annular seal lip 250. The spring 248 is located in the groove 254 and urges the lower annular seal lip 250 into engagement with the piston rod 64.

The lower annular seal lip 250 acts primarily as a seal that keeps hydraulic fluid within the shock absorber 30. Any hydraulic fluid that adheres to the outer surface of the piston rod 64 will be wiped off of the piston rod 64 back into shock absorber 30 by the lower annular seal lip 250. The upper annular seal lip 252 acts primarily as a seal that keeps dirt and other contaminants out of the shock absorber 30. Any dirt or contaminants located on the outer surface of the piston rod 64 will be wiped off by the upper annular seal lip 252. While acting primarily as a dirt seal, the upper annular seal lip 252 will also act as an oil seal to keep hydraulic fluid within the shock absorber 30.

With continued reference to FIGS. 8A and 8B, the aperture 180 of the oil seal cap 80 has a diameter that is large enough to accommodate the piston rod 64 and the upper annular seal lip 252 of the oil seal 234, such that the piston rod 64 and the upper annular seal lip 252 do not contact the oil seal cap 80.

The upper rim 256 of the seal body 244 is located radially outward from the upper annular seal lip 252 and extends upward above the positioning ring 246 opposite the groove 254 and the spring 248. The oil seal 234 further includes an upper annular surface 258 located radially between the upper rim 256 and the upper annular seal lip 252. The upper rim 256 and the upper annular seal lip 252 extend upward away from the upper annular surface 258 along longitudinal axis 70. The upper annular surface 258 is recessed with respect to the upper rim 256 and the upper annular seal lip 252. The oil seal 234 is pressed against the inner surface 175 of the end wall 170 of the oil seal cap 80 by the shoulder 236 of the rod guide 232. In some embodiments, the upper rim 256 of the seal body 244 contacts the inner transition surface 202 of the oil seal cap 80. The radial location of the inner transition surface 202 is designed such that there is a sufficient contact area between the rim 256 of the oil seal 234 and the inner transition surface 202 that reduces or eliminates the possibility of the rim 256 sliding radially toward the longitudinal axis 70. This reduces or prevents the oil seal from becoming dislodged from its desired position in the shock absorber 30. The radial location of the inner transition surface 202 is further designed so that a sufficient height or distance of the second outer annular surface 188 can be achieved to protect the oil seal 234. If the radial location of the inner transition surface 202 is too close to the longitudinal axis 70, then the desired height of the second outer annular surface 188 cannot be achieved. If the radial location of the inner transition surface 202 is far away from the longitudinal axis 70, then the oil seal 234 will not be held in the desired position.

As shown in FIGS. 8A and 8B, the oil seal 234 does not extend above the second end wall portion 178 of the oil seal cap 80. The second outer annular surface 188 is therefore at or above the top of the upper annular seal lip 252 of the oil seal 234. The upper annular seal lip 252 does not extend longitudinally along axis 70 above the second outer annular surface 188 of the oil seal cap 80. The second end wall portion 178 (or ridge) of the oil seal cap 80 serves to protect the oil seal 234. The second end wall portion 178 (or ridge) serves as an oil seal 234 protection feature. During certain compression strokes of the shock absorber, the jounce bumper 50 will contact the oil seal cap 80 instead of contacting the oil seal 234, and in particular the upper annular seal lip 252 of the oil seal 234. Previous shock absorbers utilized a bumper plate welded on the top of an oil seal cap or a jounce bumper cap placed over the oil seal cap, which served as a barrier between the oil seal and the jounce bumper and would prevent damage to the oil seal. However, because the second end wall portion 178 (or ridge) of the oil seal cap 80 is located at or above the oil seal 234, the second end wall portion 178 (or ridge) protects the oil seal 234 from contact with the jounce bumper 50 when the shock absorber 30 is in a compressed state. In some embodiments, even if a portion of the oil seal 234 protrudes slightly above the second end wall portion 178 (or ridge), the second end wall portion 178 (or ridge) is still able to reduce the exposure and limit loading of the oil seal 234 from impacts by the jounce bumper 50. Accordingly, a bumper plate or jounce bumper cap is not required. The oil seal cap 80 thus allows for a reduction of parts, a reduction of weight, and a reduction of the cost of the shock absorber 30, while still providing protection to the oil seal 234.

Additionally, due to the second inner annular surface 186 being located the sixth distance 200 (see FIG. 7) from the first inner annular surface 182, there is provided a gap located longitudinally between the upper annular surface 258 of the oil seal 234 and the second inner annular surface 186 of the oil seal cap 80. This gap may aid in preventing a force from the impact of the jounce bumper 50 on the oil seal cap 80 from being directly transferred into the oil seal 234. Additionally, the second end wall portion 178 (or ridge) transfers a load from an impact of the jounce bumper 50 to the first end wall portion 176 and to the sidewall 172 of the oil seal cap 80. This tends to reduce or eliminate the imposition of a load on the oil seal 234, that could damage or dislodge the oil seal 234.

As shown in FIG. 8B, at least a portion of the sidewall 172 of the oil seal cap 80 cooperates with the top end 86 of the reserve tube 83 to seal the fluid reservoir chamber 82. The second sidewall portion 206 of the sidewall 172 may be sized to fit inside the reserve tube 83. For example, as shown in FIG. 8B, a portion of the top end 86 of the reserve tube 83 has a reserve tube inner diameter 260. In some embodiments, the top end 86 of the reserve tube 83 is machined to achieve the desired reserve tube inner diameter 260. The top end 86 of the reserve tube 83 terminates in a reserve tube end face 261. The machined inner diameter 260 may extend a length 262 toward the bottom end 87 of the reserve tube 83, terminating in a shoulder 264. The length 262 of the machined inner diameter 260 is sufficient to allow a sufficient portion of the sidewall 172 to be inserted into the reserve tube 83. For example, as shown in FIG. 8B, a majority of the second sidewall portion 206 may be inserted into the reserve tube 83. In some embodiments, the reserve tube inner diameter 260 is the nominal inner diameter of the reserve tube 83 and a machining operation may not be required. The second outer diameter 222 of the second sidewall portion 206 may be equal to or slightly less than the reserve tube inner diameter 260, such that the second sidewall portion 206 of the sidewall 172 can slide into the to the top end 86 of the reserve tube 83. In some embodiments, the reserve tube inner diameter 260 and the second outer diameter 222 may be selected to provide a press fit between the reserve tube 83 and the oil seal cap 80. The oil seal cap 80 may be affixed to the reserve tube 83, for example, by a resistance weld 266.

With continued reference to FIG. 8B, the top end 86 of the reserve tube 83 terminates in a reserve tube end face 261. The reserve tube end face 261 is perpendicular to the longitudinal axis 70. The reserve tube end face 261 is an annular shape that is perpendicular to the longitudinal axis 70. When the shock absorber 30 is assembled, the rod guide 232 contacts the pressure tube 60, the rod guide 232 contacts at least a portion of the oil seal 234, and at least a portion of the oil seal 234 contacts the oil seal cap 80, such that the oil seal 234 is sandwiched between the oil seal cap 80 and the rod guide 232 with no portion of the reserve tube 83 being between the oil seal 234 and the oil seal cap 80. No portion of the reserve tube 83 contacts the oil seal 234. The reserve tube end face 261 is located below the oil seal 234 along the longitudinal axis 70. The top end 86 of the reserve tube 83 is not roll formed to have a roll closure. Because the oil seal cap 80 is utilized in the shock absorber 30 without a roll formed reserve tube 83, the reserve tube roll forming operation during the manufacture of typical shock absorbers is avoided or eliminated, resulting in reduced cycle times and/or reduced manufacturing costs. Additionally, because the oil seal cap 80 is utilized in the shock absorber 30 without a roll formed reserve tube 83, this may lead to less waste of at least reserve tubes as improper roll forms leading to cracking of the roll form in the reserve tube are eliminated. Furthermore, because the oil seal cap 80 is utilized in the shock absorber 30 without a roll formed reserve tube 83 stress risers at the location of a typical roll form are eliminated.

In addition to protecting the oil seal 234 from damage, the oil seal cap 80 described herein is a single part that serves to: (1) close the top end of the shock absorber 30, (2) retain the oil seal 234 in the desired location; and (3) and protect the oil seal 234 from damaging impacts from the jounce bumper 50. The oil seal cap 80 is not a two-part cap and does not require the use of a roll forming operation in order to close the top end of the shock absorber 30. By utilizing a single, integrated oil seal cap 80 that offers the ability to close the top end of the shock absorber 30, retain the oil seal 234 in place, and protect the oil seal 234, the oil seal cap 80 offers improved strength and durability as compared to shock absorbers utilizing an external bumper plate, a slide on oil seal cap, a two-part oil seal cap, or a roll formed reserve tube.

Figure 9:
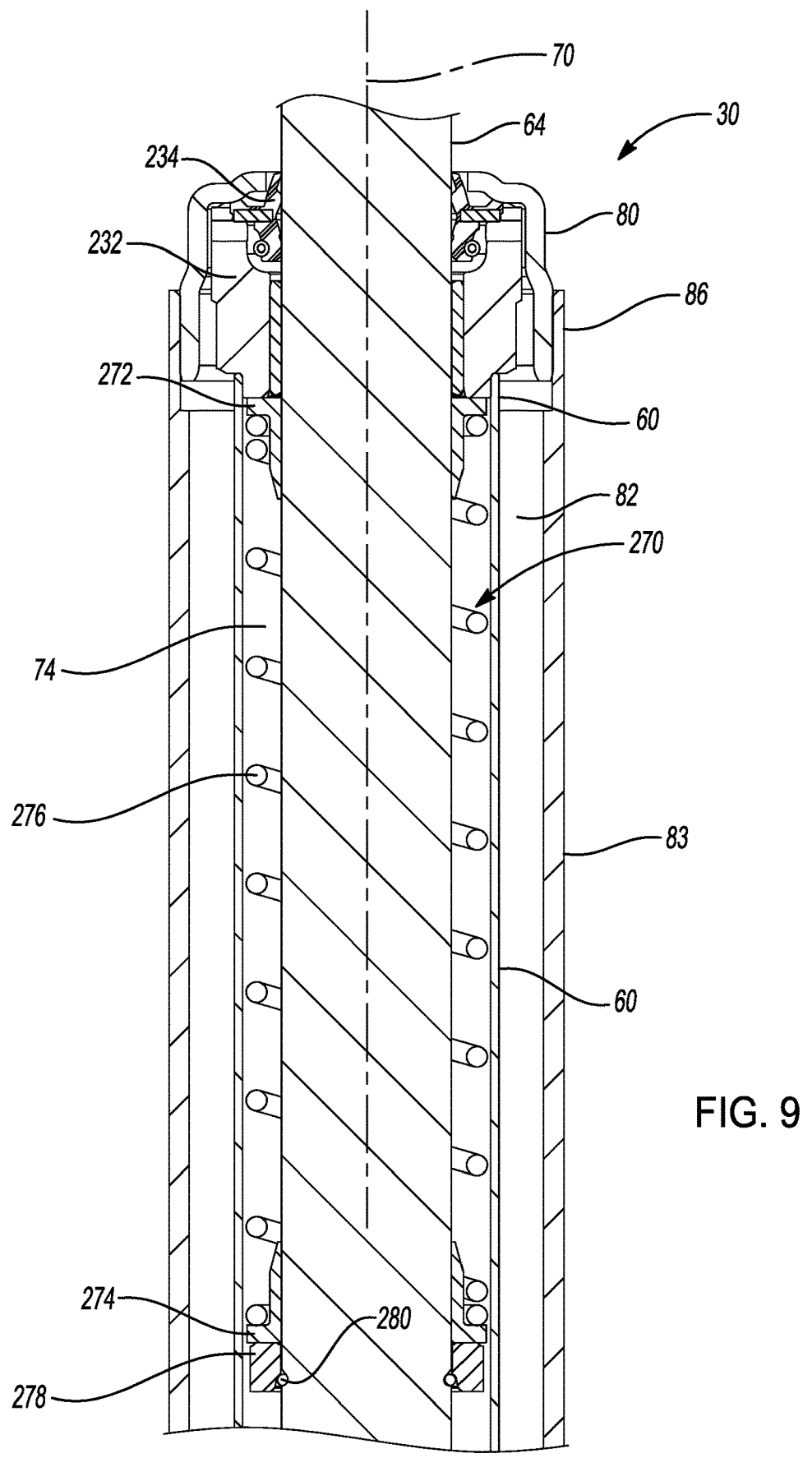
FIG. 9 is an enlarged side view, in cross-section of an embodiment of an internal rebound spring assembly that may be included in some embodiments of the shock absorber in FIG. 3.

Now with reference to FIG. 9, in some embodiments, the shock absorber 30 includes an internal rebound spring system 270. The internal rebound spring system 270 includes a first spring retainer 272, a second spring retainer 274, an internal rebound spring 276 between the first spring retainer 272 and the second spring retainer 274, and a collar 278. The first spring retainer 272, second spring retainer 274, internal rebound spring 276, and the collar 278 are each located radially around the piston rod 64 and are located in the upper working chamber 74 of the shock absorber 30. The first spring retainer 272, second spring retainer 274, internal rebound spring 276, and the collar 278 are each located radially between the pressure tube 60 and the piston rod 64. The collar 278 is around the piston rod 64 and is prevented from moving toward the bottom of the shock absorber by, for example, a retention ring 280. The second spring retainer 274 is around the piston rod 64 and rests on top of the collar 278, between the collar 278 and the oil seal cap 80. The internal rebound spring 276 is around the piston rod 64 and rests on top of the second spring retainer 274, between the second spring retainer 274 and the oil seal cap 80. The first spring retainer 272 is around the piston rod 64 and rests on top of the internal rebound spring 276, between the internal rebound spring 276 and the oil seal cap 80. Accordingly, the internal rebound spring 276 is located between the first spring retainer 272 and the second spring retainer 274. The first spring retainer 272 abuts against the bottom of the rod guide 232 and is prevented from movement toward the oil seal 234 by the rod guide 232.

The internal rebound spring 276 helps keep the piston rod 64 and the piston body 90 near the factory static ride height during normal operation and enables a vehicle manufacturer to use lighter-weight and/or smaller-diameter anti-sway bars. The internal rebound spring 276 provides additional resistance to vehicle lean and sway, which may be required for vehicles equipped with lighter-weight and/or smaller-diameter anti-sway bars. A shock absorber 30 equipped with an internal rebound spring 276 uses the force of suspension motion to fully extend.

Figure 10:
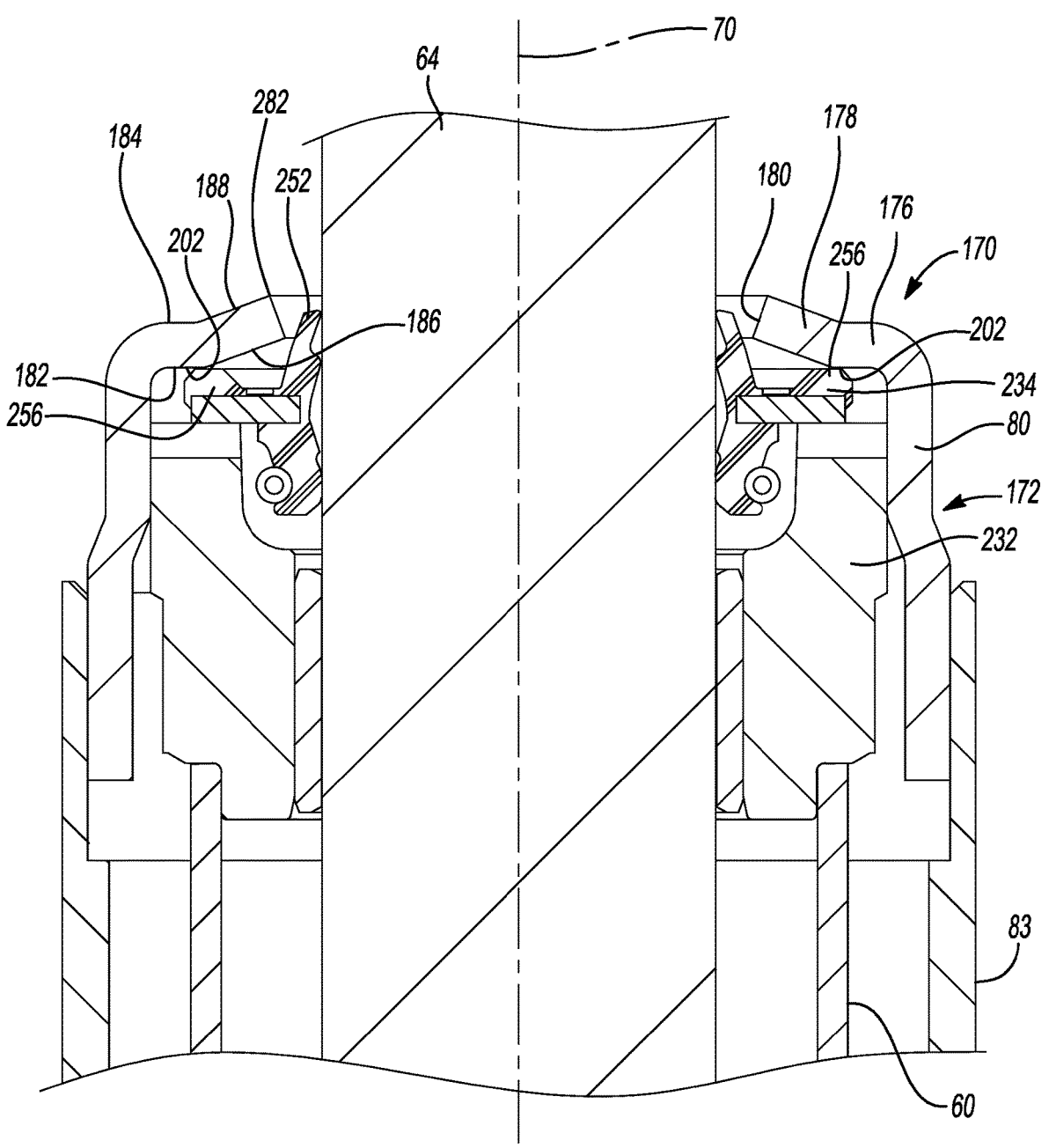
FIG. 10 is an enlarged side view, in cross-section of the sealing system showing another embodiment of an oil seal cap in accordance with the present disclosure.
Figures 11, 12:
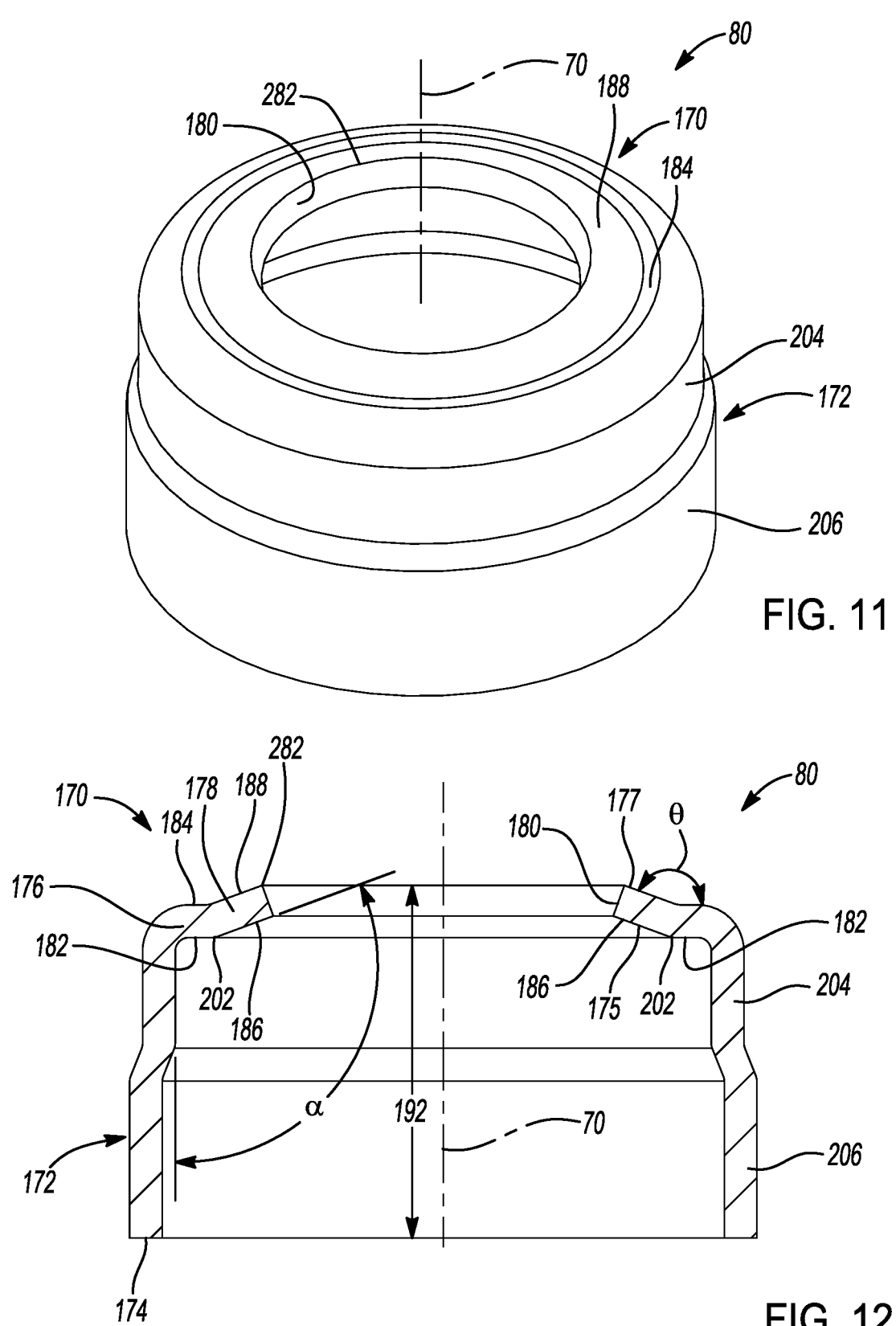
FIG. 11 is a perspective view of the embodiment of the oil seal cap of FIG. 10.
FIG. 12 is a side view, in cross-section of the oil seal cap of FIG. 10.

Referring now to FIGS. 10, 11, and 12, an alternative embodiment of the oil seal cap 80 is shown and described where, instead of being parallel to one another, the second end wall portion 178 is at an angle with respect to the first end wall portion 176. For example, as shown in FIG. 12, the second outer annular surface 188 is at angle Θ with respect to the first outer annular surface 184. The second inner annular surface 186 may also be at angle Θ with respect to the first inner annular surface 182. The second end wall portion 178 is at an angle with respect to the sidewall 172. For example, the second inner annular surface 186 is at an angle α with respect to the sidewall 172. The second outer annular surface 188 may also be at angle α with respect to the sidewall 172.

With continued reference to FIGS. 10, 11, and 12, the aperture 180 and the second outer annular surface 188 meet to form a circle 282 that has its center coincident with the longitudinal axis 70. The circle 282 is in a plane that is perpendicular to the longitudinal axis 70. As shown in FIG. 10, the circle 282 is at or above the upper annular seal lip 252 of the oil seal 234. At least a portion of the second end wall portion 178 is at or above the upper annular seal lip 252 of the oil seal 234. With respect to the oil seal cap 80 shown in FIGS. 10, 11, and 12, the second distance 192 of the second outer annular surface 188 is the distance from the sidewall end surface 174 to the circle 282.

The oil seal cap 80 shown in FIGS. 10, 11, and 12 protects the oil seal 234 similar to the oil seal cap 80 shown in FIGS. 2-9. During certain compression strokes of the shock absorber, the jounce bumper 50 will contact the oil seal cap 80. Because the second end wall portion 178 (or ridge) of the oil seal cap 80 and the circle 282 are located at or above the oil seal 234, the second end wall portion 178 (or ridge) and the circle 282 protect the oil seal 234 from contact with the jounce bumper 50 when the shock absorber 30 is in a compressed state.

Figure 13:
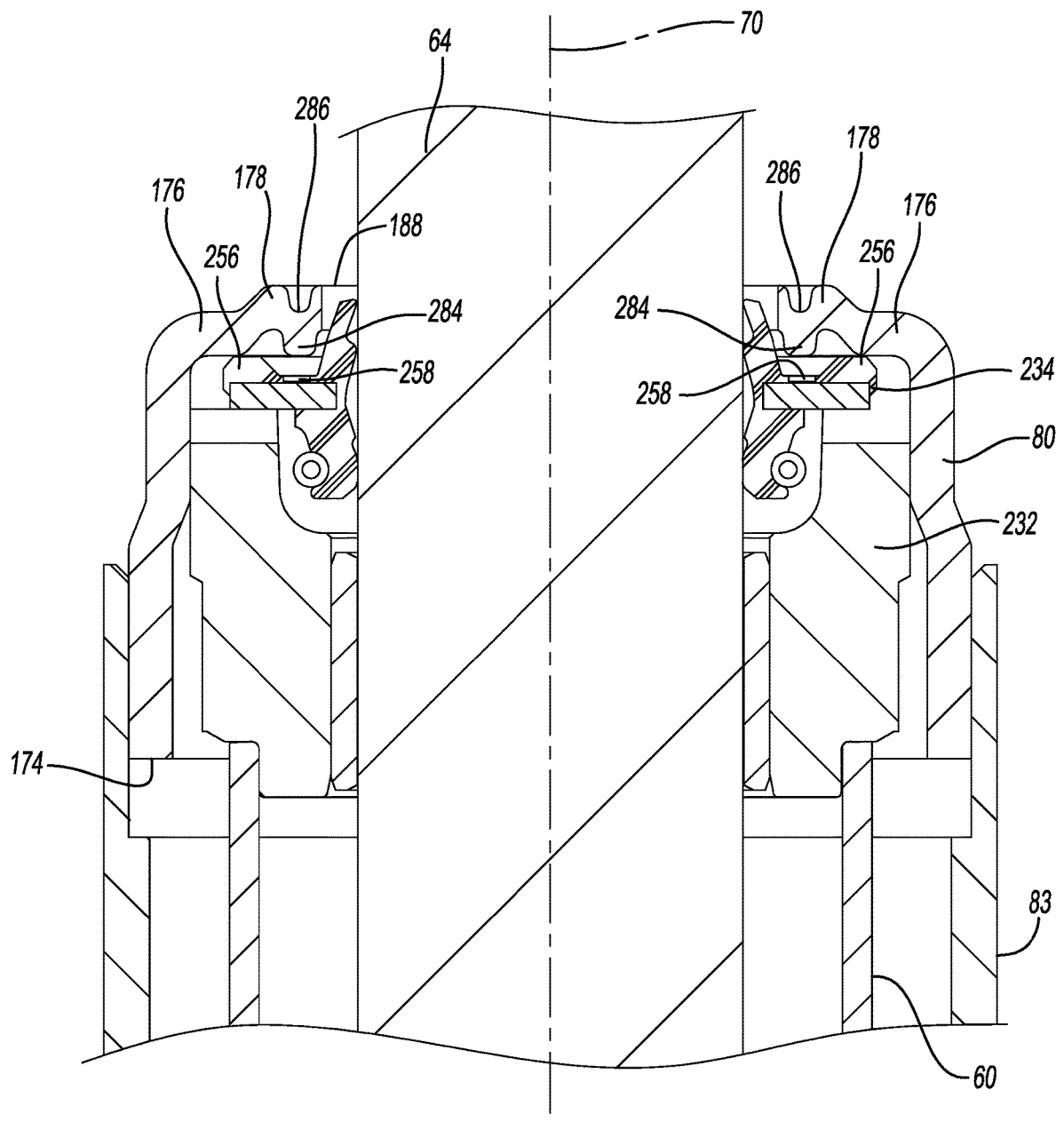
FIG. 13 is an enlarged side view, in cross-section of the sealing system showing another embodiment of an oil seal cap in accordance with the present disclosure.
Figures 14, 15:
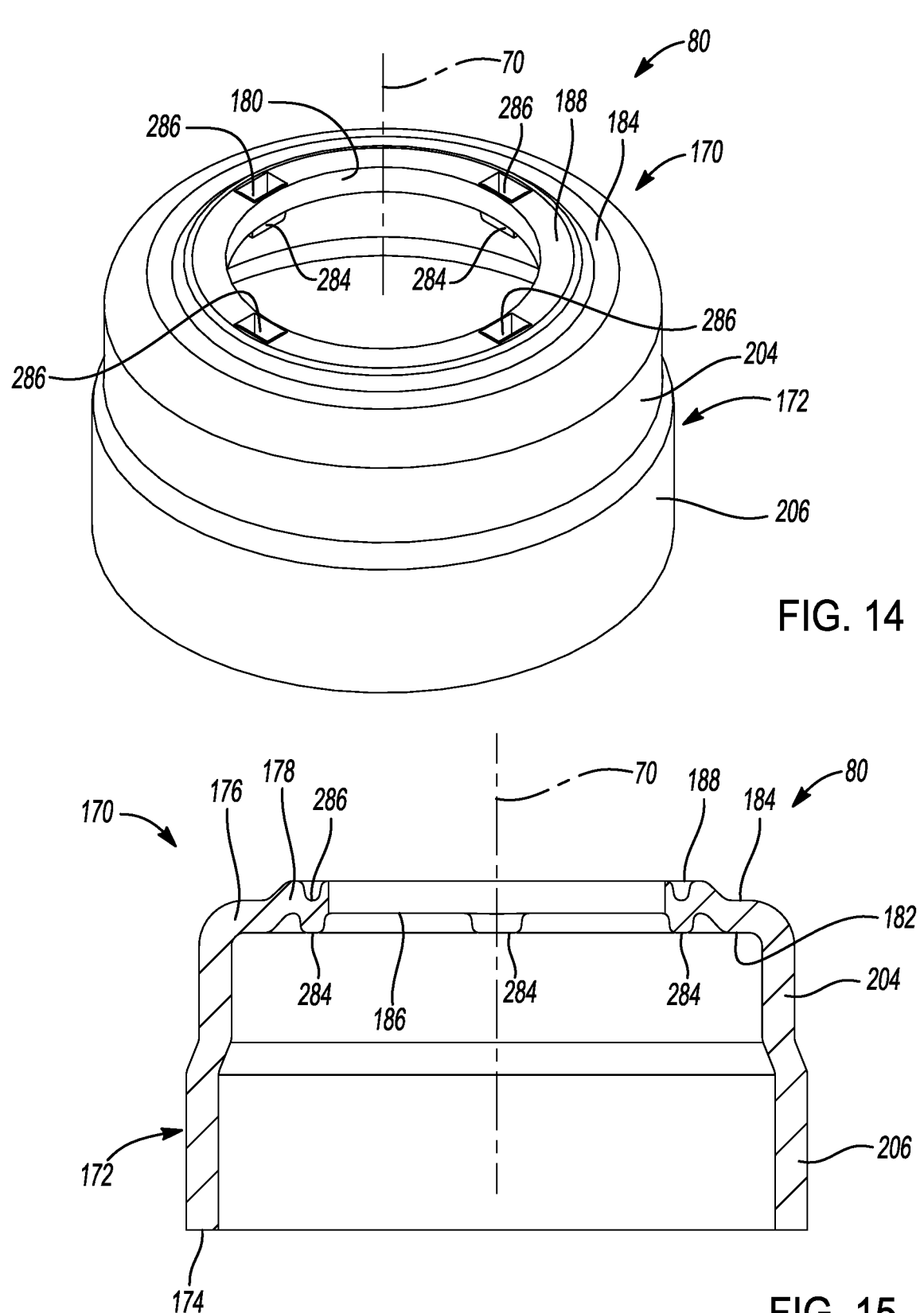
FIG. 14 is a perspective view of the embodiment of the oil seal cap of FIG. 13.
FIG. 15 is a side view, in cross-section of the oil seal cap of FIG. 13.

Referring now to FIGS. 13, 14, and 15, an alternative embodiment of the oil seal cap 80 is shown and described. The embodiment of the oil seal cap 80 shown in FIGS. 13, 14, and 15 is similar to the embodiment of the oil seal cap 80 shown in FIGS. 2-9, but also includes one or more projections 284 in the second end wall portion 178 extending toward the bottom of the oil seal cap 80. For example, the one or more projections 284 may extend from the second inner annular surface 186 away from the second outer annular surface 188 and toward the sidewall end surface 174. The one or more projections 284 extend toward the upper annular surface 258 of the oil seal 234. In some embodiments, the one or more projections 284 contact the upper annular surface 258 of the oil seal 234. The one or more projections 284 may aid in the retention of the oil seal 234 if the upper rim 256 moves or if the oil seal 234 flexes and needs additional support during high damper cycle frequencies. The one or more projections 284 may reduce or eliminate the movement of the upper rim 256 radially inward toward the piston rod 64. The one or more projections 284 restrict movement of the oil seal 234 with respect to the pressure tube 60.

The one or more projections 284 may be formed by a staking operation in which a die is pressed into the second outer annular surface 188. The one or more projections 284 may be formed prior to assembly of the oil seal cap 80 into the shock absorber 30 or after assembly of the oil seal cap 80 into the shock absorber 30. For example, in some embodiments, the one or more projections 284 may be formed after assembly of the oil seal cap 80 into the shock absorber 30 and a die may be pressed into the oil seal cap 80 until the one or more projections 284 contact the upper annular surface 258 of the oil seal 234. Forming the one or more projections 284 may result in corresponding depressions 286 in the second outer annular surface 188. Although shown as having four projections 284, some embodiments of the oil seal cap 80 may have less than four projections 284 (i.e., one projection 284, two projections 284, or three projections 284). Additionally, some embodiments of the oil seal cap 80 have greater than four projections 284. The one or more projections 284 may be equally spaced circumferentially around the longitudinal axis 70. For example, where there are four projections 284, each projection 284 may be spaced 90 degrees from an adjacent projection 284.

Figure 16:
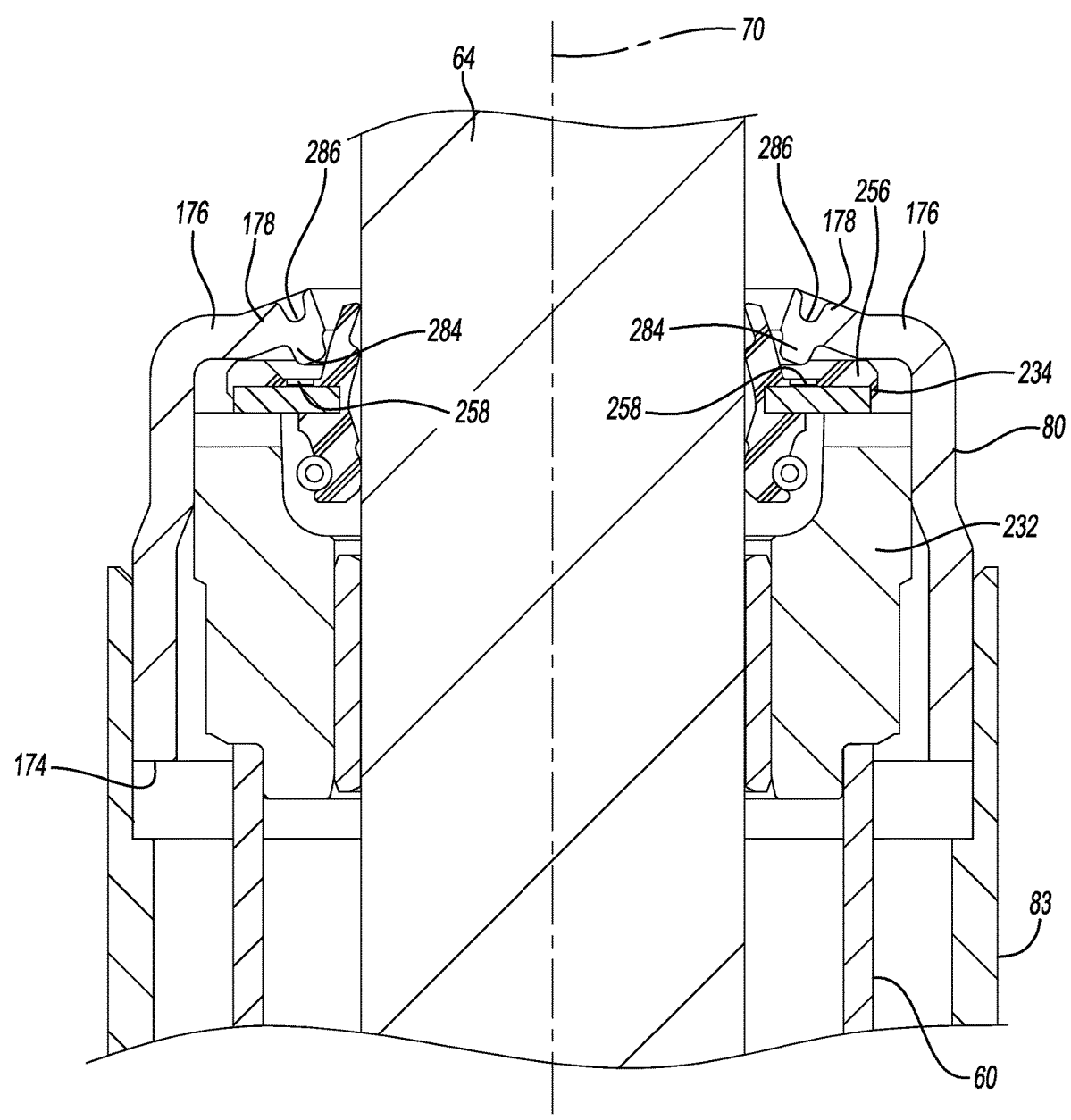
FIG. 16 is an enlarged side view, in cross-section of the sealing system showing another embodiment of an oil seal cap in accordance with the present disclosure.
Figures 17, 18:
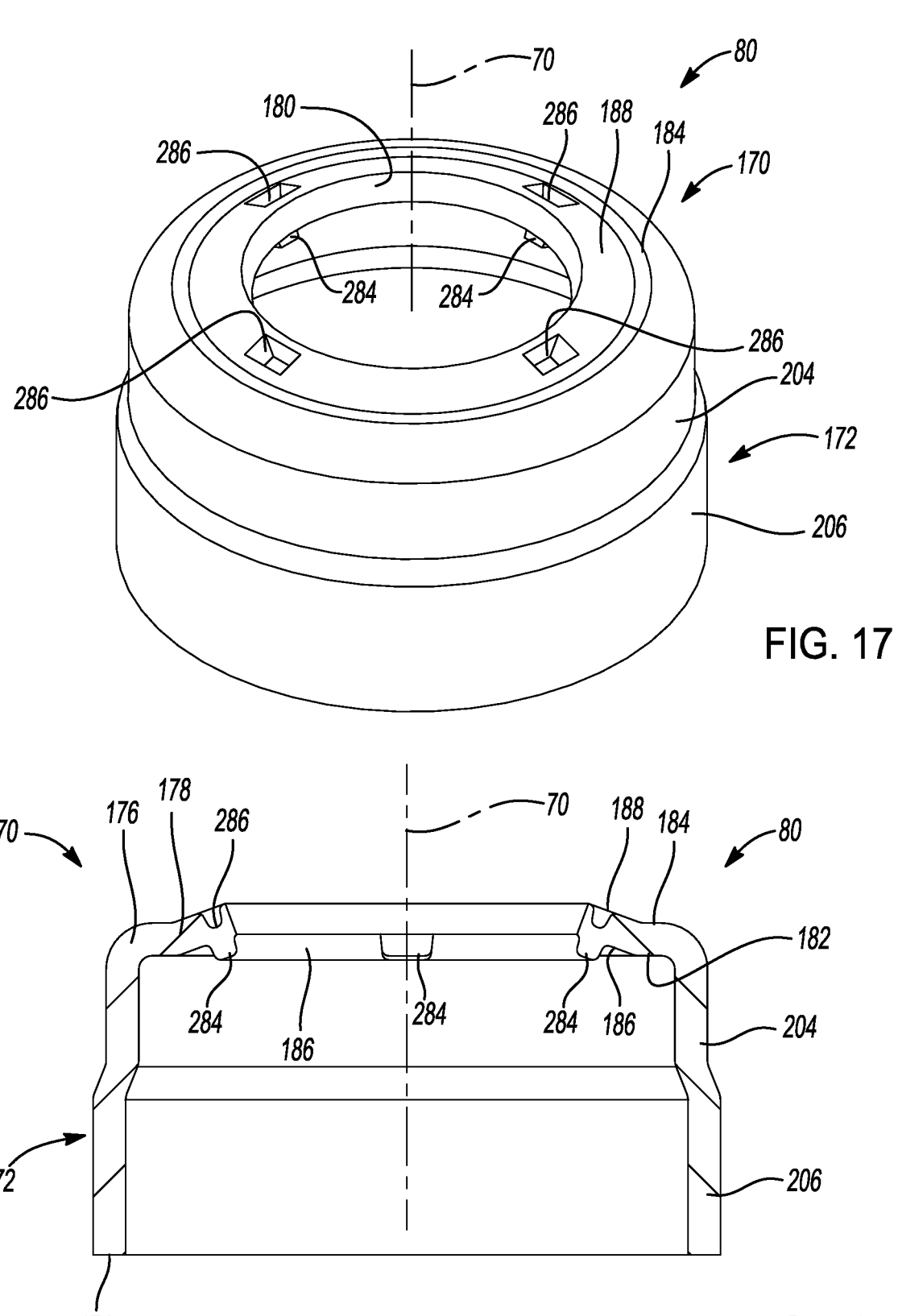
FIG. 17 is a perspective view of the embodiment of the oil seal cap of FIG. 16.
FIG. 18 is a side view, in cross-section of the oil seal cap of FIG. 16.

Referring now to FIGS. 16, 17, and 18, an alternative embodiment of the oil seal cap 80 is shown and described. The embodiment of the oil seal cap 80 shown in FIGS. 13, 14, and 15 is similar to the embodiment of the oil seal cap 80 shown in FIGS. 10, 11, and 12, but also includes one or more projections 284 in the second end wall portion 178 extending toward the bottom of the oil seal cap 80. The one or more projections 284 extend perpendicular to the second inner annular surface 186. The one or more projections 284 may be at an angle with respect to the longitudinal axis 70.

Although the oil seal cap 80 is shown and described as part of a shock absorber 30 having both a pressure tube 60 and a reserve tube 83, it is to be understood that the oil seal cap 80 may be part of a shock absorber having only a pressure tube 60. In such embodiments, the oil seal cap 80 is affixed to the top of the pressure tube 60 to seal the top of the pressure tube 60.

Although the oil seal cap 80 is shown and described as part of a shock absorber 30 having the piston body 90, compression valve assembly 92, rebound valve assembly 94, and base valve assembly 68, it will be understood that the arrangement of components of the piston body 90, compression valve assembly 92, rebound valve assembly 94, and base valve assembly 68 is exemplary and in some embodiments the number, type, and arrangement of components may differ without departing from the scope of the invention.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A shock absorber for a vehicle comprising:

a pressure tube;

a piston rod extending within the pressure tube along a longitudinal axis;

a piston assembly slidably fitted in the pressure tube for movement along the longitudinal axis;

a reserve tube surrounding the pressure tube, the reserve tube having a reserve tube inner diameter;

an oil seal cap coupled to the reserve tube, the oil seal cap comprising:

an end wall comprising an end wall inner surface, an end wall outer surface, a first end wall portion, a second end wall portion, and an aperture extending through the end wall, wherein the first end wall portion includes a first inner annular surface and a first outer annular surface, and the second end wall portion includes a second inner annular surface and a second outer annular surface; and a circumferential sidewall extending longitudinally from the end wall along the longitudinal axis, wherein the sidewall terminates in a sidewall end surface, wherein the sidewall has a sidewall outer diameter that is equal to or less than the reserve tube inner diameter, and wherein at least a portion of the sidewall is located within the reserve tube;

wherein the first outer annular surface is located a first distance away from the sidewall end surface and the second outer annular surface is located a second distance away from the sidewall end surface, wherein the second distance is greater than the first distance;

wherein the second outer annular surface extends at an angle greater than 90 degrees with respect to the circumferential sidewall;

an oil seal, wherein at least a portion of the oil seal is in contact with the end wall inner surface of the oil seal cap, wherein the oil seal is at or axially offset from the second outer annular surface of the oil seal cap toward the sidewall end surface; and a rod guide, wherein the oil seal is between the rod guide and the oil seal cap.

2. The shock absorber of claim 1, wherein the rod guide includes a recessed shoulder, and wherein a portion of the oil seal is in contact with the recessed shoulder.

3. The shock absorber of claim 1, wherein the second outer annular surface is parallel to the first outer annular surface.

4. The shock absorber of claim 1, wherein the oil seal comprises a seal body having:

a lower annular seal lip engaging the piston rod;

an upper annular seal lip engaging the piston rod;

and an upper rim contacting the end wall inner surface of the oil seal cap.

5. The shock absorber of claim 4, wherein the oil seal cap further comprises an inner transition surface and the upper rim contacts one or more of the first inner annular surface and the inner transition surface.

6. The shock absorber of claim 4, wherein the upper annular seal lip does not extend longitudinally above the second outer annular surface of the oil seal cap.

7. The shock absorber of claim 1, further comprising a jounce bumper surrounding the piston rod, wherein the second outer annular surface is contacted by the jounce bumper during certain compression strokes of the shock absorber.

8. The shock absorber of claim 1, wherein the oil seal cap further comprises one or more projections extending from the end wall toward the sidewall end surface, wherein the one or more projections retain the oil seal in position within the shock absorber.

9. A shock absorber for a vehicle comprising:

a pressure tube;

a piston rod, at least a portion of which extends within the pressure tube along a longitudinal axis;

a jounce bumper through which at least a portion of the piston rod extends;

a piston assembly slidably fitted in the pressure tube for movement along the longitudinal axis;

an oil seal cap, the oil seal cap comprising:

an end wall having an end wall inner surface and an end wall outer surface, an aperture extending through the end wall; and a circumferential sidewall extending longitudinally from the end wall in a first direction, wherein a portion of the end wall includes a ridge extending longitudinally in a second direction opposite the first direction, wherein the ridge extends at an angle greater than 90 degrees with respect to the longitudinal axis;

an oil seal in contact with the end wall inner surface, wherein:

the oil seal cap is longitudinally between the jounce bumper and the oil seal;

the oil seal is at or axially offset from the ridge of the oil seal cap in the first direction; and the ridge prevents the jounce bumper from contacting the oil seal during certain compression strokes of the shock absorber; and a reserve tube surrounding the pressure tube and wherein at least a portion of the sidewall of the oil seal cap is located within a portion of the reserve tube.

10. The shock absorber of claim 9, further comprising a rod guide, wherein the rod guide is in contact with at least a portion of the oil seal opposite the oil seal cap.

11. The shock absorber of claim 9, wherein the ridge is perpendicular to the longitudinal axis.

12. The shock absorber of claim 9, wherein the ridge has an annular shape around the aperture.

13. The shock absorber of claim 9, further comprising a gap between a portion of the oil seal and the ridge of the oil seal cap.

14. The shock absorber of claim 9, wherein the oil seal cap cooperates with the oil seal to close the shock absorber, retain the oil seal in a desired position, and protect the oil seal cap from damaging impacts from the jounce bumper.

15. A shock absorber for a vehicle comprising:

a pressure tube;

a piston rod extending within the pressure tube along a longitudinal axis;

a piston assembly slidably fitted in the pressure tube for movement along the longitudinal axis;

a reserve tube surrounding the pressure tube;

an oil seal cap coupled to the reserve tube, the oil seal cap comprising;

an end wall having an end wall inner surface and an end wall outer surface, wherein the end wall inner surface includes a first inner surface and a second inner surface and the end wall outer surface includes a first outer surface and a second outer surface, wherein the second inner surface is a first longitudinal distance away from the first inner surface and the second outer surface is a second longitudinal distance away from the first outer surface;

an aperture extending through the end wall, wherein the piston rod extends through the aperture; and a circumferential sidewall extending longitudinally from the end wall, wherein at least a portion of the sidewall is received within the reserve tube, and wherein at least a portion of the reserve tube surrounds at least a portion of the sidewall;

an oil seal having a seal body comprising:

a lower annular seal lip surrounding the piston rod;

an upper annular seal lip surrounding the piston rod, wherein the upper annular seal lip is axially positioned between the second outer surface and the second inner surface of the oil seal cap and does not extend longitudinally beyond the second outer surface of the oil seal cap;

an upper rim in contact with the end wall inner surface of the oil seal cap; and an upper annular surface, wherein there is a gap between the upper annular surface and the second inner surface of the end wall; and a rod guide in contact with at least a portion of the oil seal, wherein the rod guide is in contact with the pressure tube opposite the oil seal;

wherein the oil seal is longitudinally sandwiched between the oil seal cap and the rod guide.

16. The shock absorber of claim 15, wherein the second outer surface is parallel to the first outer surface.

17. The shock absorber of claim 15, wherein the second outer surface is at an angle with respect to the first outer surface.

18. The shock absorber of claim 15, wherein the oil seal cap further comprises one or more projections extending toward the oil seal, wherein the one or more projections restrict the movement of the oil seal with respect to the pressure tube.

\* \* \* \* \*